(12) United States Patent
Fleurisson et al.

(10) Patent No.: US 11,863,464 B2
(45) Date of Patent: Jan. 2, 2024

(54) RESOURCE UTILIZATION IN RESOURCE RESERVATION PROTOCOL SPLIT TUNNELS WITH ADAPTIVE SUB-TUNNELING

(71) Applicant: Arista Networks, Inc., Santa Clara, CA (US)

(72) Inventors: Damien Fleurisson, Vancouver (CA); Kalash Nainwal, Surrey (CA); Martin Stigge, Vancouver (CA); Max Xiao, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 17/752,598

(22) Filed: May 24, 2022

(65) Prior Publication Data

US 2023/0388245 A1    Nov. 30, 2023

(51) Int. Cl.
*H04L 47/724* (2022.01)
*H04L 47/70* (2022.01)
*H04L 12/46* (2006.01)

(52) U.S. Cl.
CPC ........ *H04L 47/724* (2013.01); *H04L 12/4633* (2013.01); *H04L 47/825* (2013.01)

(58) Field of Classification Search
None
See application file for complete search history.

(56) References Cited

U.S. PATENT DOCUMENTS

| 5,184,347 | A  | * | 2/1993  | Farwell | H04J 3/0658 370/335 |
| 7,415,208 | B1 | * | 8/2008  | Haggans | H04J 14/0227 398/57 |
| 9,923,798 | B1 | * | 3/2018  | Bahadur | H04L 45/00 |
| 11,243,600 | B2 | * | 2/2022  | Chung   | G06F 1/3225 |
| 2001/0037401 | A1 | * | 11/2001 | Soumiya | H04L 47/11 709/224 |

(Continued)

FOREIGN PATENT DOCUMENTS

| CN | 101312371 A | * | 11/2008 | ........... H04B 7/0452 |
| CN | 101478495 B | * | 8/2011  | |

OTHER PUBLICATIONS

RSVP-TE Extensions to RSVP for LSP tunnel ( RFC 3209) (Year: 2019).*

*Primary Examiner* — Younes Naji
(74) *Attorney, Agent, or Firm* — Fountainhead Law Group, P.C.

(57) ABSTRACT

Management of a plurality of sub-tunnels is disclosed herein. Resource utilization of a plurality of sub-tunnels of a network tunnel implementing a Resource Reservation Protocol is monitored. A resource utilization of a first set of the sub-tunnels exceeding a defined utilization threshold is detected. As a result of the detection, an adjusted resource utilization is determined for a second set of the sub-tunnels. The resource utilization of the second set of sub-tunnels may be less than a defined utilization threshold. The adjusted resource utilization is established for the second set of sub-tunnels for a next measurement interval. The adjusted resource utilization of each sub-tunnel of the second subset of sub-tunnels may be less than a lowest resource utilization among the first set of sub-tunnels.

20 Claims, 12 Drawing Sheets

(56) References Cited

U.S. PATENT DOCUMENTS

| | | | | |
|---|---|---|---|---|
| 2002/0024935 A1* | 2/2002 | Furukawa | ............. | H04B 7/155 |
| | | | | 370/349 |
| 2009/0150542 A1* | 6/2009 | Yahiro | ................ | G06F 11/3495 |
| | | | | 709/224 |
| 2013/0242725 A1* | 9/2013 | Rabie | ................... | H04L 45/306 |
| | | | | 370/228 |
| 2017/0024484 A1* | 1/2017 | Qiu | ........................ | H04W 4/02 |

* cited by examiner

RESOURCE UTILIZATION IN RESOURCE RESERVATION PROTOCOL SPLIT TUNNELS WITH ADAPTIVE SUB-TUNNELING

BACKGROUND

The present application relates to network tunneling and, more particularly, to management of resource utilization of one or more network tunnels.

Some communication protocols may reserve and allocate network resources used to establish and maintain network tunnels between nodes in a network. In some situations, a plurality of sub-tunnels having the same bandwidth may be implemented to satisfy a large demand for network resources. The network resources of the sub-tunnels in such situations are managed together such that the sub-tunnels each have the same allocation of network resources. To accommodate an influx of network traffic, the bandwidth for each of the sub-tunnels may be increased by the same amount. For instance, a plurality of sub-tunnels may have the same amount of bandwidth at a first time. The bandwidth of each of the sub-tunnels may be increased by the same amount at a second time to satisfy an increased demand.

This approach to distributing network resources causes oversubscription to one or more of the sub-tunnels when the network traffic distribution is non-uniform over the sub-tunnels having the same allocated network resource. Moreover, according to this approach, an amount of network traffic on one of the sub-tunnels may be smaller than an amount of network resources allocated to the sub-tunnel. As a result, other sub-tunnels of the tunnel may become unnecessarily saturated, inhibiting allocation of bandwidth and reducing the overall operational efficiency of the network tunnel.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Overview

Figure 1:
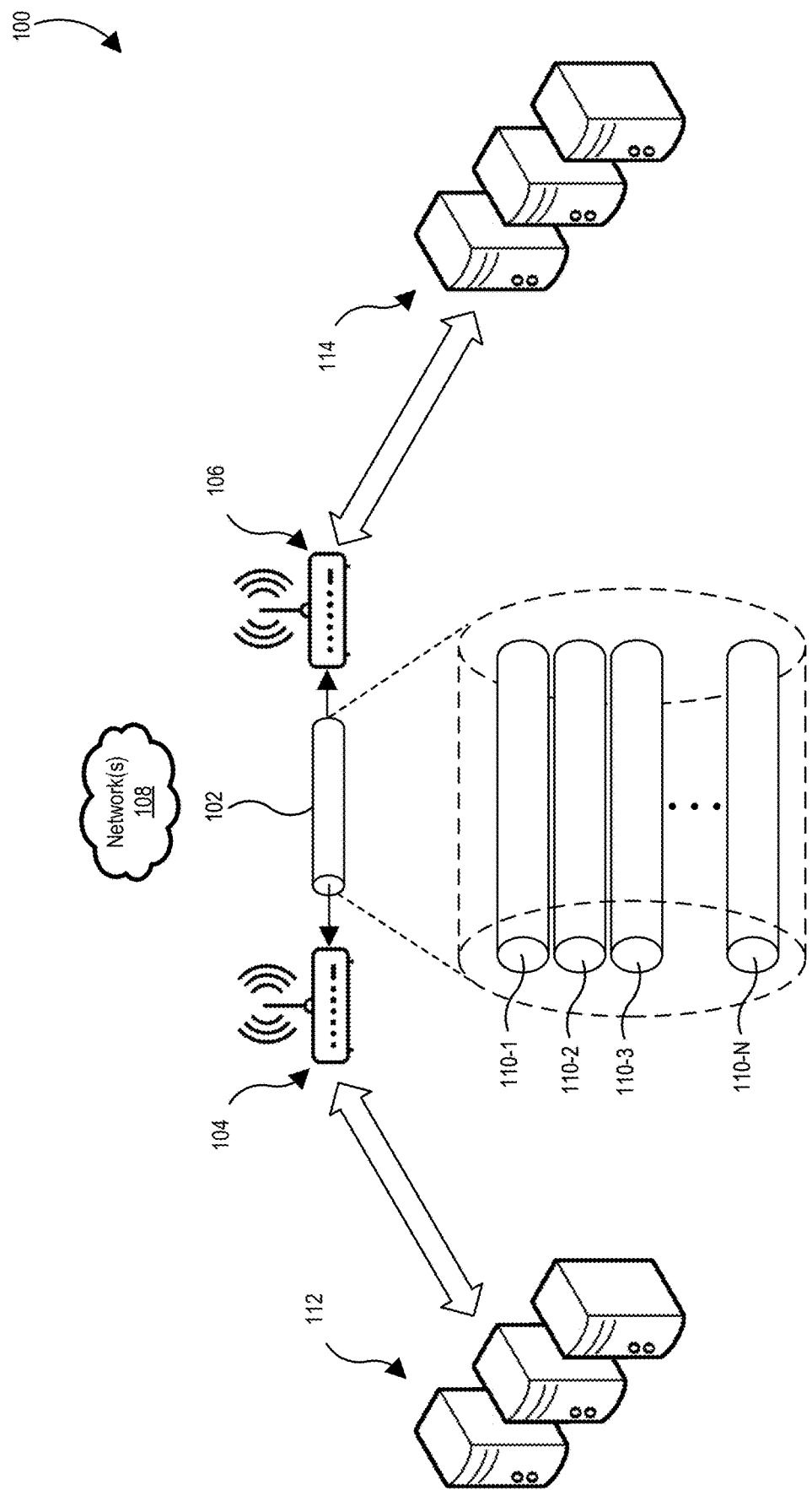
FIG. 1 illustrates an example environment in which a network tunnel conveys network traffic between network devices according to one or more embodiments.

The present disclosure describes management of individual sub-tunnels of a Resource Reservation Protocol (RSVP) tunnel. In the following description, for purposes of explanation, numerous examples and specific details are set forth to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Each of a plurality of sub-tunnels of a given RSVP tunnel are monitored and the number and/or bandwidth attributes of the sub-tunnels may be individually adjusted based on network traffic conditions. An aggregate bandwidth of the plurality of sub-tunnels is calculated for a given time interval. A data point for the aggregate bandwidth is recorded in an aggregate bandwidth data set for a plurality of time intervals. A desired number of sub-tunnels may be determined based on the collection of aggregate bandwidth data set. The number of sub-tunnels and/or bandwidth of each sub-tunnel may be adjusted based on the aggregate bandwidth data set.

The term "sub-tunnel," as used herein refers to a network tunnel of a plurality of tunnels established between two adjacent nodes in a network. The plurality of tunnels are monitored as a group and each sub-tunnel has one or more attributes that are controlled to achieve desired operational characteristics for the network tunnel. The plurality of sub-tunnels are logically associated together as a group in some embodiments. The plurality of sub-tunnels are provided in the same layer of an Open Systems Interconnection (OSI) model.

The term "bandwidth," as used herein, refers to network capacity. More particularly, "bandwidth" refers to the amount of data that can be transferred through a network device or collection of network devices over a given time interval. In some embodiments, bandwidth refers to the average bit rate that a network device or collection of network devices can sustain over a given time interval. In some embodiments, bandwidth refers to the peak bit rate that a network device or collection of network devices can sustain over a given time interval. It is understood that network resources of a network device or a collection of network devices may be adjusted to increase or decrease bandwidth.

The number of sub-tunnels may be reduced in some instances. For a given adjustment interval, the aggregate bandwidth of all the sub-tunnels is determined for intervals in the adjustment interval. If the aggregate bandwidth for every interval in the given adjustment interval is less than a difference between the maximum aggregate value for the sub-tunnels and a bandwidth for a single sub-tunnel, the number of sub-tunnels may be reduced to improve resource efficiency.

The bandwidth for one or more of the sub-tunnels may be reallocated based on a least-fill technique. If the current number of sub-tunnels cannot accommodate the maximum aggregate bandwidth using the least-fill technique, the number of sub-tunnels may be increased and the bandwidth redistributed among the sub-tunnels. According to the least-fill technique, a maximum allowed value is defined (e.g., by a network administrator) for sub-tunnel bandwidth. Based on the aggregate bandwidth data set, the maximum bandwidth usage for a given adjustment interval and for each sub-tunnel is determined. If the highest bandwidth usage for any of the sub-tunnels exceeds the maximum allowed value, an iterative process is performed to redistribute the excess bandwidth.

To redistribute the excess bandwidth, the total excess bandwidth for the adjustment interval is calculated. The plurality of sub-tunnels are sorted according to maximum bandwidth usage (e.g., lowest-to-highest) for the given adjustment interval. The excess bandwidth is equally distributed over values corresponding to the maximum bandwidths of the sub-tunnels for a successively increasing subset of the sub-tunnels. For instance, the excess bandwidth is added to the lowest maximum bandwidth among the sub-tunnels. If the result of the addition still exceeds the maximal allowed bandwidth, then the excess bandwidth is distributed among the two lowest output bandwidths of the sub-tunnels and the result is compared with the maximal allowed bandwidth. This process is repeated until either (i) the redistributed bandwidth for every sub-tunnel is below the maximal allowed bandwidth, or (ii) an additional sub-tunnel is added to accommodate the excess bandwidth if distribution of the excess bandwidth does not produce a result below the maximal allowed bandwidth.

Modifications involving collection size and/or types of data collections may be included in the foregoing techniques to improve speed and/or reduce the amount of data stored. As a result of the foregoing techniques, bandwidth usage efficiency of a tunnel is improved. Moreover, oversubscription and/or saturation of the sub-tunnels is reduced relative to at least some previous solutions.

System Architecture

FIG. 1 illustrates an environment 100 in which a network tunnel 102 conveys network traffic between network devices according to one or more embodiments. The network tunnel 102 conveys network traffic comprising data packets between a tunnel source-end or head-end (TSE) 104 and a tunnel endpoint (TEP) 106. The network tunnel 102 is established and operates according to a Resource Reservation Protocol (RSVP) or protocol related to RSVP (e.g., RSVP—Traffic Engineering). The network tunnel 102 is established over one or more networks 108 between the TSE 104 and the TEP 106. In some embodiments, the TSE 104 may be a headend or source network device and the TEP 106 may be a tail-end or destination network device.

The network tunnel 102 operates according to RSVP, which is a Multi-Protocol Label Switching protocol. RSVP network tunnels are provided on a source router and installed into a Routing Information Base (RIB) after the corresponding Multi-protocol Label Switching (MPLS) LSPs have been established successfully. In some embodiments, the network tunnel 102 may be used for communications involving nodes other than the TSE 104 and the TEP 106 that are local to the tunnel destination node.

The network tunnel 102 includes a plurality of sub-tunnels 110-1, 110-2, . . . 110-N (collectively "sub-tunnels 110") for conveying network traffic between the TSE 104 and the TEP 106. Each of the sub-tunnels 110 is established, controlled, and/or maintained according to RSVP. In some embodiments, the network tunnel 102 is a logical tunnel and the plurality of sub-tunnels 110 are each individual network tunnels operated according to RSVP.

Load-balancing may be implemented in the network tunnel 102 to manage network traffic and bandwidth utilization. In some implementations of the network tunnel 102, each of the plurality of sub-tunnels 110 may have an equal bandwidth and may be established based on current demand. However, a non-uniform distribution of network traffic among the sub-tunnels 110 may cause oversubscription to one or more of the sub-tunnels 110. Moreover, when an amount of network traffic on one or more sub-tunnels 110 is smaller than a size of the sub-tunnel, the network may become unnecessarily saturated, preventing or limiting allocation of bandwidth for other network tunnels than the network tunnel 102.

According to one or more embodiments herein, network bandwidth of the sub-tunnels 110 may be individually monitored and selectively adjusted based on resource utilization of the sub-tunnels 110. During a rebalance time interval, The TSE 104 monitors the sub-tunnels 110 individually or collectively to collect first resource utilization information. The number of sub-tunnels 110 may be adjusted (e.g., increased, decreased) based on the first resource utilization information collected. In some instances, the number of sub-tunnels may be increased during or at the end of an adjustment interval. In some instances, the number of sub-tunnels may be decreased during or at the end of a rebalance interval.

In some embodiments, the number of sub-tunnels 110 may be increased for an adjustment interval as a result of on a determination that the current number of sub-tunnels 110 is insufficient to satisfy the aggregate resource utilization. In some embodiments, the number of sub-tunnels 110 may be decreased for a rebalance interval as a result of a determination that the aggregate resource utilization could be satisfied using fewer sub-tunnels than the current number of sub-tunnels 110.

In some implementations, there may be other network tunnels established between the TSE 104 and the TEP 106 that are not considered as being sub-tunnels 110. In such implementations, the other network tunnels are not monitored and controlled in connection with the sub-tunnels 110, as described herein.

The rebalance interval observed by the TSE 104 may be set or selectively adjusted by an authorized user, such as a network administrator. During a rebalance time interval, the TSE 104 may monitor the sub-tunnels 110 to collect second resource utilization information. Resources of the sub-tunnels 110 may be allocated or adjusted at the end of the adjustment interval based on the second resource utilization information.

According to the features described herein, utilization of network resources at the individual sub-tunnel level may be monitored. Network resources for individual sub-tunnels 110 may be reserved and/or allocated based on one or more parameters, such as network resource utilization. The TSE 104 may adjust the number of sub-tunnels 110 operating at a given time based on data collected during the rebalance interval.

The TSE 104 and/or the TEP 106 may mediate communications between computing devices. The TSE 104 may be communicatively coupled with a first set of host devices 112. The TEP 106 may be communicatively coupled with a second set of host devices 114. Non-limiting examples of host devices include servers, laptops, desktops, and mobile devices (e.g., smart phones, tablet computers). The TSE 104 may convey network traffic originating from one of the host devices 112 over one of the sub-tunnels 110 to the TEP 106, which may provide the network traffic to one of the host devices 114 based on identifying information associated with the network traffic.

Each of the sub-tunnels 110 may have additional identifying information that the TSE 104 and the TEP 106 use to distinguish the individual sub-tunnels 110. The tunnel identifier may be included in the routing and/or reachability information advertised to the host devices 112 and/or 114.

Figure 2:
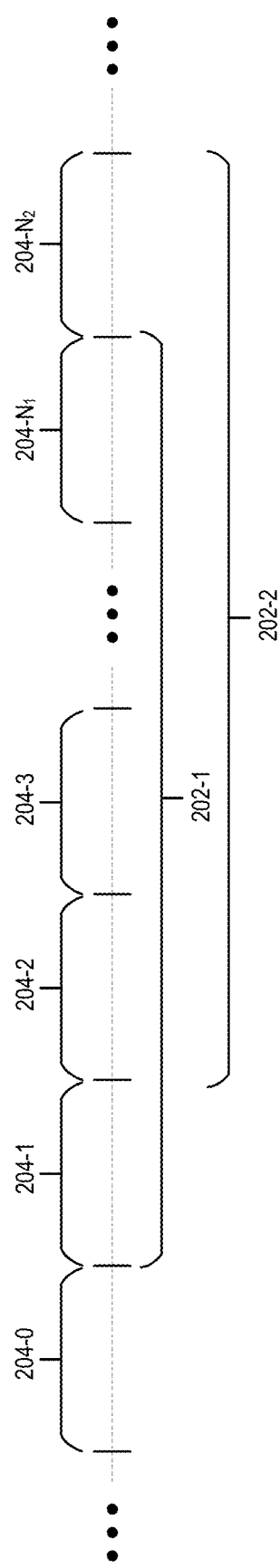
FIG. 2 illustrates diagram representing time intervals during which data sets are collected and analyzed by a network device according to one or more embodiments.

FIG. 2 illustrates a diagram 200 representing time intervals during which data sets are collected and analyzed by a network device according to one or more embodiments. The diagram 200 includes rebalance intervals 202 in which the TSE obtain first resource utilization data associated with the sub-tunnels 110. The diagram 200 includes a set of adjustment intervals 204-1, 204-2, ... 204-N (collectively "adjustment intervals 204") during which the TSE 104 obtains second resource utilization data associated with the sub-tunnels 110. An individual adjustment interval 204 is a shorter time interval than the rebalance interval 202.

The first resource utilization data includes data regarding the aggregate bandwidth collectively utilized by the plurality of sub-tunnels 110 during the rebalance interval 202-1. The second resource utilization data includes data regarding the bandwidth utilized by the individual sub-tunnels 110 during the adjustment interval $204$-$N_1$. In the adjustment, the TEP determines whether to adjust network resource utilization for one or more of the sub-tunnels 110 based on the first resource utilization data. The TEP also determines whether to adjust the number of sub-tunnels 110 based on the second resource utilization data in the adjustment. Further description of the adjustment is described with respect to FIGS. 4 through 7B and elsewhere herein.

The rebalance interval 202 includes a plurality N of the adjustment intervals 204. The TSE 104 and/or the TEP 106 may store values in memory controlling a length of time of the rebalance interval 202 and/or a length of time of each of the adjustment intervals 204. In some embodiments, temporally adjacent adjustment intervals 204 are consecutive without an intervening break—for instance, the adjustment interval 204-2 begins when the adjustment interval 204-1 ends.

Adjustments of one or more attributes of the sub-tunnels 110 may be performed at an end of each adjustment interval 204 based on resource utilization for the preceding rebalance interval 202 and/or the preceding adjustment interval 204. At an end of each adjustment interval 204, the first and second resource utilization data are assessed to determine whether to adjust attributes of the network tunnel 102, as discussed with respect to FIGS. 3, 4, and elsewhere herein. A tunnel node (e.g., the TSE 104) collects first resource utilization data regarding network resources utilized for the plurality of sub-tunnels 110 for a rebalance interval 202-1. The tunnel node (e.g., the TSE 104) also collects second resource utilization data regarding network resources utilized for the plurality of sub-tunnels 110 for an adjustment interval 204. After the adjustment interval $204$-$N_1$, the tunnel node evaluates the first resource utilization data for the rebalance interval 202-1 and evaluates the second resource utilization data for the adjustment time interval $204$-$N_1$.

The TSE 104 collects the first resource utilization data for the rebalance interval 202-2 that includes the adjustment interval $204$-$N_2$ after the adjustment interval $204$-$N_1$. The TSE 104 also collect the second resource utilization data for the adjustment interval $204$-$N_2$ after the adjustment interval $204$-$N_1$. At or near the end of the adjustment interval $204$-$N_2$, the first and second resource utilization data are evaluated by the tunnel node (e.g., TSE 104, TEP 106) to determine whether to adjust parameters of the tunnel 102.

Figure 3:
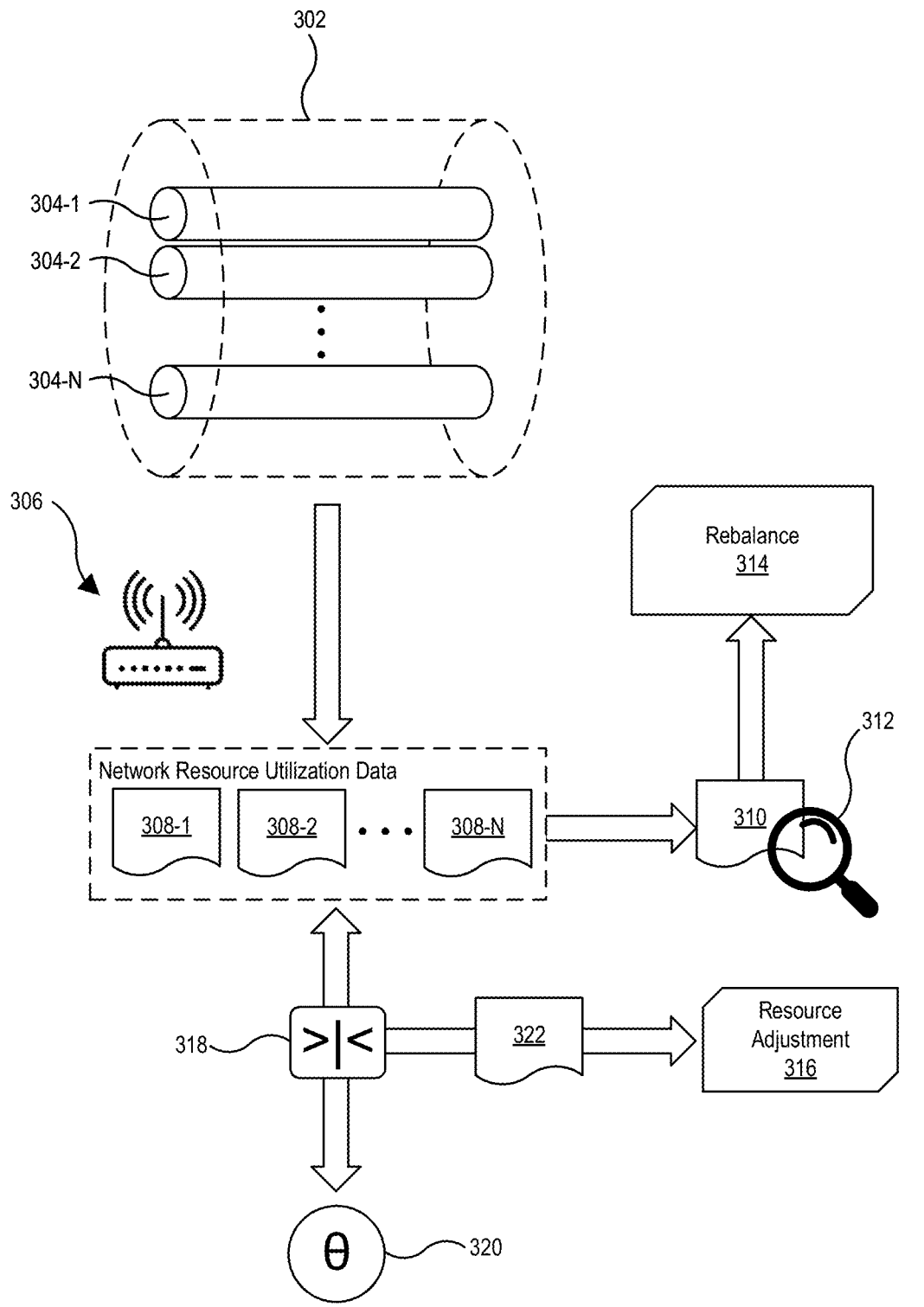
FIG. 3 illustrates an environment in which resource utilization data for a plurality of sub-tunnels is collected and analyzed over one or more time intervals according to one or more embodiments.

FIG. 3 shows an environment 300 in which resource utilization data for a plurality of sub-tunnels is collected and analyzed over one or more time intervals according to one or more embodiments. A network tunnel 302 that includes a plurality of sub-tunnels 304-1, 304-2, ... 304-N is established for conveying network traffic as described with respect to FIG. 1 and elsewhere herein. The tunnel 302 is established between a tunnel node or point 306 (e.g., the TSE 104) and another tunnel node or point (e.g., the TEP 106) for conveying network traffic. The tunnel node 306 collects sets of network resource utilization data 308-1, 308-2, ... 308-N (collectively "resource utilization data 308") for an individual adjustment interval 204 described with respect to FIG. 2. The sets of network resource utilization data 308-1, 308-2, ... 308-N respectively correspond to network resource utilization of the sub-tunnels 304-1, 304-2, ... 304-N.

The network resource utilization data 308 may indicate the network bandwidth utilized by the sub-tunnels 304 over the adjustment interval. In some embodiments, the resource utilization data 308 may include data points corresponding to network resource utilization data at given times during the adjustment interval. For instance, the resource utilization data 308-1 may include data points $X_1$, $X_2$, ... $X_N$ each indicating network bandwidth utilization for the sub-tunnel 304-1 at given times $t_1$, $t_2$, ... $t_N$ in an adjustment interval. The term "network bandwidth utilization," as used herein, refers to the network throughput or amount of network data successfully transferred through a sub-tunnel or a tunnel in a given time interval. For instance, network bandwidth utilization may refer to a peak throughput of data conveyed through a tunnel or sub-tunnel over a given time interval t or may refer to a total throughput of data conveyed through a tunnel or sub-tunnel over the given time interval t.

For a given adjustment interval, the tunnel node 306 processes the resource utilization data 308 and determines whether to rebalance the sub-tunnels 304 based on a result of the processing. More particularly, the tunnel node 306 updates a set of aggregate network resource utilization data 310 for a current rebalance interval that includes the current adjustment interval for which the sets of resource utilization data 308 was obtained. For an adjustment interval, the tunnel node 306 determines the set of aggregate network resource utilization 310 for the sub-tunnels 304 for individual times $t_1, t_2, \ldots t_N$ during the adjustment interval.

By way of non-limiting example, the tunnel node 306 calculates an aggregate resource utilization $U_{t1}$ of a given set of data points $X_{11}, X_{21}, \ldots X_{N1}$ indicating respective resource utilization for sub-tunnels 304-1, 304-2, ... 304-N for a first given time or time interval $t_1$ in the adjustment time interval 204-$N_1$. The tunnel node 306 sets the aggregate resource utilization $U_{t1}$ as the maximum aggregate resource utilization $U_{MAX}$ for the adjustment time interval. The tunnel node 306 then calculates an aggregate resource utilization Ute of a given set of data points $X_{12}, X_{22}, \ldots X_{N2}$ indicating respective resource utilization for sub-tunnels 304-1, 304-2, ... 304-N for a second given time or time interval $t_2$ in the adjustment time interval 204-$N_1$. If the aggregate resource utilization $U_{t2}$ is greater than the aggregate resource utilization $U_{t1}$, the aggregate resource utilizations Ute is set as the new maximum aggregate resource utilization $U_{MAX}$ for the aggregate time interval. Otherwise, the aggregate resource utilization $U_{t1}$ remains the maximum aggregate resource utilization $U_{MAX}$ and the tunnel node 306 calculates an aggregate resource utilization $U_{t3}$ of a given set of data points $X_{13}, X_{23}, \ldots X_{N3}$ for a third given time or time interval $t_3$ in the adjustment time interval 204-$N_1$.

As a result of processing the network resource utilization data 308 for the adjustment time interval 204-$N_1$, the tunnel node 306 updates the aggregate network utilization data 310 to include the maximum aggregate resource utilization $U_{MAX}$ for the adjustment interval 204-$N_1$. In some embodiments, the tunnel node 306 may remove or exclude from consideration maximum aggregate resource utilization for adjustment intervals that are not within the current rebalance interval 202-1, such as a maximum aggregate resource utilization $U_{MAX}$ for an adjustment interval 204-0 preceding the adjustment interval 204-1.

The tunnel node 306 performs an assessment 312 of the updated maximum aggregate resource utilization $U_{MAX}$ and determines, based on a result of the assessment 312, whether to perform a rebalance procedure 314. In the assessment 312, the tunnel node 306 determines a minimal number of sub-tunnels 304 over the entire rebalance interval 202-1 that can satisfy the maximum aggregate resource utilization $U_{MAX}$. In some situations, the tunnel node 306 may reduce the number of sub-tunnels 304 as a result of a determination that a smaller number of sub-tunnels can accommodate the maximum aggregate resource utilization $U_{MAX}$. In some situations, the tunnel node 306 may increase the number of sub-tunnels 304 as a result of a determination that the current number of sub-tunnels is insufficient to accommodate the maximum aggregate resource utilization $U_{MAX}$. Incrementing the number of sub-tunnels 304 may be performed at the end of an adjustment interval (e.g., the resource adjustment 316) in at least some embodiments. Further description regarding the rebalance procedure 314 is provided with respect to FIG. 4 infra.

The tunnel node 306 also evaluates each set of network resource utilization data 308 and determines whether to perform a resource adjustment 316 involving the sub-tunnels 304. The tunnel node 306 performs a comparison 318 between network resource utilization during a current adjustment interval for each of the sub-tunnels 304 with a defined utilization threshold 320. The tunnel node 306 updates excess utilization data 322 to indicate amounts of the resource utilization that exceed the defined utilization threshold 320 for the adjustment interval. The tunnel node 306 performs the resource adjustment 316 for the sub-tunnels 304 based on the excess utilization data 322. In some embodiments, performance of the resource adjustment 316 is performed subsequent to the rebalance procedure 314. Further description of the resource adjustment 316 is described with respect to FIGS. 4 through 6E infra.

Figure 4:
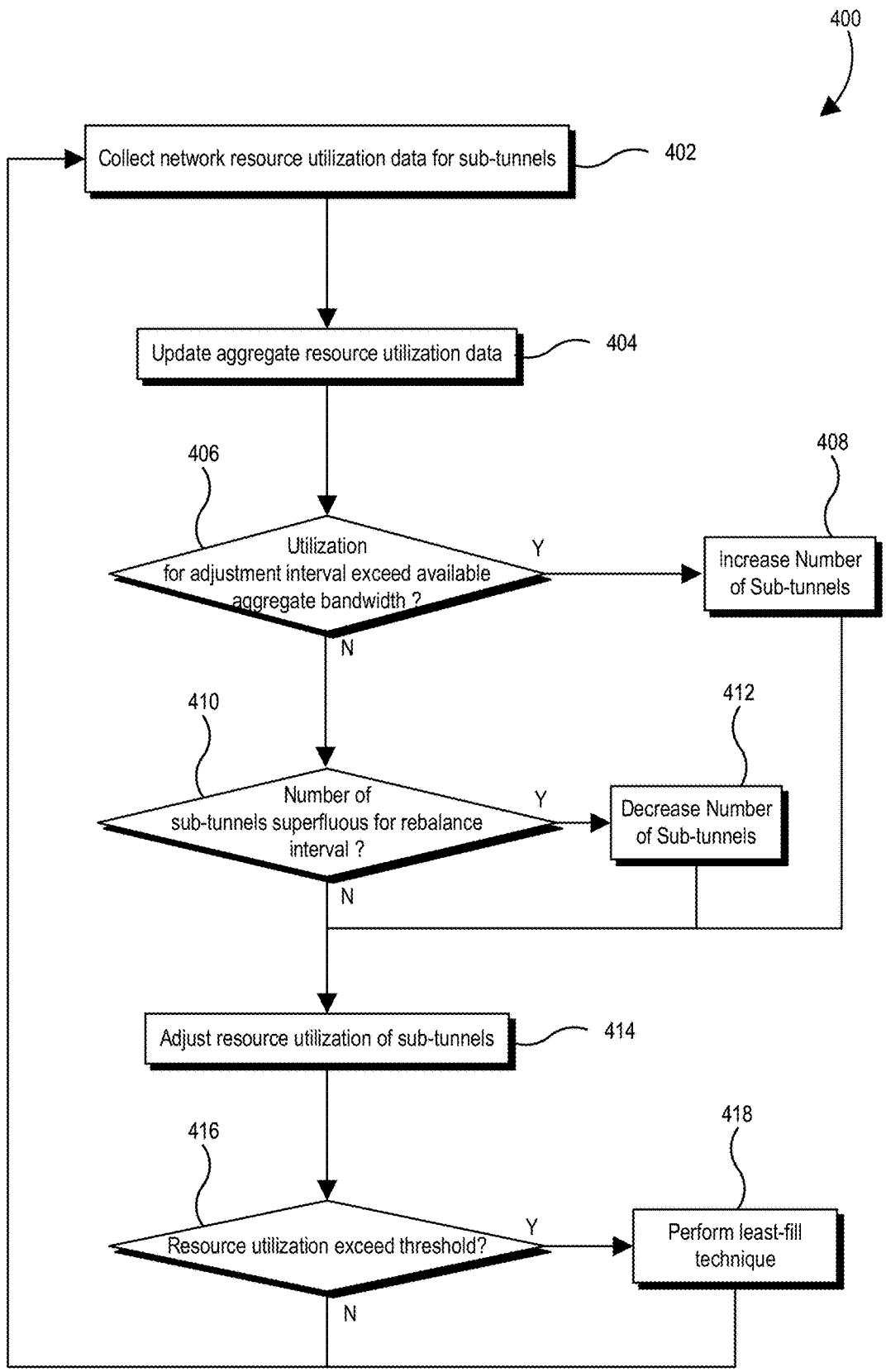
FIG. 4 illustrates a method for managing operation of a plurality of sub-tunnels of a network tunnel according to one or more embodiments.

FIG. 4 shows a method 400 for managing operation of a plurality of sub-tunnels of a network tunnel according to one or more embodiments. The method 400 may be performed by an appropriate device, system, or entity described herein, such as the tunnel node 306. The method 400 includes collecting 402 network resource utilization data regarding network resource utilization by the sub-tunnels 304 of the network tunnel 302. The resource utilization data is collected for individual sub-tunnels 304 over a current adjustment interval, such as the adjustment interval 204-$N_1$ described with respect to FIG. 2. For example, the tunnel node 306 may collect, for an adjustment interval (e.g., 5 minutes), a set of resource utilization data 308 for each of the sub-tunnels 304.

The method 400 includes updating, at 404, aggregate resource utilization data based on the resource utilization data collected in 402. The aggregate resource utilization data includes data indicating an aggregate of the resources collectively used by the sub-tunnels 304 for each of the adjustment intervals 204-1, 204-2, 204-3, ... 204-$N_1$. The tunnel node 306 may select an aggregate value of a sub-interval to use to represent the aggregate resource utilization data for each adjustment interval 204. By way of non-limiting example, for a given adjustment interval 204, the tunnel node 306 may select a highest collective resource utilization, an average collective resource utilization, or a median collective resource utilization. Updating, in 404, involves including the selected collective resource utilization to the aggregate resource utilization data 310.

The method 400 also includes determining, at 406, whether the resource utilization of the sub-tunnels 304 implemented for the adjustment interval (e.g., adjustment interval 204-1 in FIG. 2) exceeds the aggregate bandwidth. More specifically, the peak aggregate resource utilization $U_{PEAK}$ of the plurality of sub-tunnels 110 may be compared with the aggregate bandwidth of the current number of sub-tunnels 304. As a result of a determination that the current number of sub-tunnels is insufficient to accommodate the peak aggregate resource utilization $U_{PEAK}$, the method 400 proceeds to increasing, at 408, the number of sub-tunnels for an adjustment interval. Increasing the number of sub-tunnels in 408 may include determining a number of new sub-tunnels 304 to add to the network tunnel 302 to bring the collective resource utilization of the sub-tunnels 304 below, or within the defined range of, the peak resource capacity. The number of sub-tunnels 304 is increased, in 408, by the number determined. The peak aggregate resource utilization $U_{PEAK}$ involved in 406 and 408 is the peak collective resource utilization for the sub-tunnels 304 observed during an adjustment period.

To increase the number of sub-tunnels 304 in 408, the tunnel node 306 may, in some embodiments, consider the effect of adding a new sub-tunnel at a lowest or minimum capacity setting and incrementally increase the capacity of the new sub-tunnel until the peak aggregate resource utilization $U_{PEAK}$ is below, or within the defined range of, the maximum resource capacity. If a maximum capacity of the new sub-tunnel is insufficient to bring the collective resource utilization below, or within the defined range of, the maximum resource capacity, the tunnel node 306 may consider the effect of adding a second new sub-tunnel to the sub-tunnels 304. The tunnel node 306 incrementing the capacity of the first and/or second new sub-tunnels until the maximum collective resource utilization for the rebalance interval is below, or within the defined range of, the maximum resource capacity for the interval. As a result of increasing the number of sub-tunnels in 408, the method 400 proceeds to adjusting, at 414, resource utilization of the sub-tunnels.

As a result of a determination, in 406, that the resource utilization for an adjustment period does not exceed the available aggregate bandwidth of the sub-tunnels 304, the method 400 proceeds to 410. At 410, the method 400 includes determining whether the number of current sub-tunnels 304 is superfluous for the rebalance interval. For instance, the tunnel node 306 may evaluate whether the collective resource utilization capacity (e.g., bandwidth) of the sub-tunnels 304 for a given adjustment interval is superfluous. The tunnel node 306 may determine that the current number N of sub-tunnels 304 is superfluous if a number M of the sub-tunnels less than a number N would satisfy the collective resource utilization for the rebalance interval.

The determination in 410 may involve evaluating whether the maximum aggregate resource utilization of the sub-tunnels 304 during the rebalance interval would be within the maximum resource capacity of a fewer number of sub-tunnels 304—for instance, (N–1) sub-tunnels. The tunnel node 306 may, for instance, evaluate whether a collective maximum utilization capacity of a fewer number of the sub-tunnels 304 exceeds a peak aggregate resource utilization during the rebalance interval. If so, the tunnel node 306 may determine how many sub-tunnels are sufficient to accommodate the collective maximum utilization capacity during the rebalance interval. The tunnel node 306, for example, may determine a new number of sub-tunnels 304 to be implemented for the next adjustment interval according to the following Equation 1:

$$N = \frac{U_{Max}}{C_T} \quad [1]$$

where N is the number of tunnels to be implemented, $U_{MAX}$ is the maximum resource utilization of the tunnel during the rebalance interval, and $C_T$ is a resource capacity of a single tunnel. The number N of tunnels may be subtracted from the current number of sub-tunnels 304 to determine the number of tunnels to be removed or discontinued for the next adjustment interval.

Subsequent to the determination in 410 or decreasing the number of sub-tunnels in 412, the method 400 proceeds to 412. At 412, the method 400 includes decreasing the number of sub-tunnels 304. The tunnel node 306 may select a sub-tunnel to be discontinued having the highest resource utilization among the sub-tunnels 304 for the adjustment interval in some embodiments. The tunnel node 306 may wait to discontinue or remove the selected sub-tunnel after a defined interval of time. For instance, the tunnel node 306 may wait for a user-defined time interval (e.g., 1-hour) or a defined number of adjustment intervals 204 before the selected sub-tunnel is removed or discontinued. During the defined interval of time, the tunnel node 306 may reincorporate the selected sub-tunnel into the plurality of sub-tunnels 304 and begin reusing the selected sub-tunnel to satisfy demand for resource utilization. For instance, the tunnel node 306 may convey network traffic using the selected sub-tunnel to accommodate a spike in demand for network resources during the defined interval of time. Because the process of initiating a new sub-tunnel involves computational resources, waiting for a defined interval of time helps to conserve use of computational resources that would otherwise be directed to reinitiating a sub-tunnel that has already been deleted.

Subsequent to the determination in 410 or decreasing the number of sub-tunnels in 412, the method 400 proceeds to 414. At 414, the method 400 involves adjusting the resource utilization of the sub-tunnels 304. Adjusting, in 414, may include redistributing network traffic among the sub-tunnels 304 and may include adjusting bandwidth allocated among the sub-tunnels 304. Redistributing network traffic may be performed according to a known procedure or technique, such as equal-cost multi-path (ECMP) routing. Adjusting bandwidth allocated among the sub-tunnels 304 may include implementing an automatic bandwidth adjustment procedure, as implemented in connection with Multi-Path Label Switching techniques. Subsequent to adjusting resource utilization in 414, the method 400 proceeds to 416.

At 416, the method 400 includes determining whether the network resource utilization of any individual sub-tunnel 304 during the current or preceding adjustment interval exceeds a defined utilization threshold. The defined utilization threshold may be a user-defined value set by an authorized user, such as a network administrator. If the resource utilization of an individual sub-tunnel 304 exceeds the defined utilization threshold, the method 400 proceeds to performing, at 418, a least-fill technique for resource utilization. Further description of the resource adjustment procedure is provided with respect to FIGS. 5 through 6E infra. Subsequent to the determination in 416 or performance of the least-fill technique in 418, the method 400 proceeds back to 402. The method 400 may be performed once for a given adjustment interval.

Figure 5:
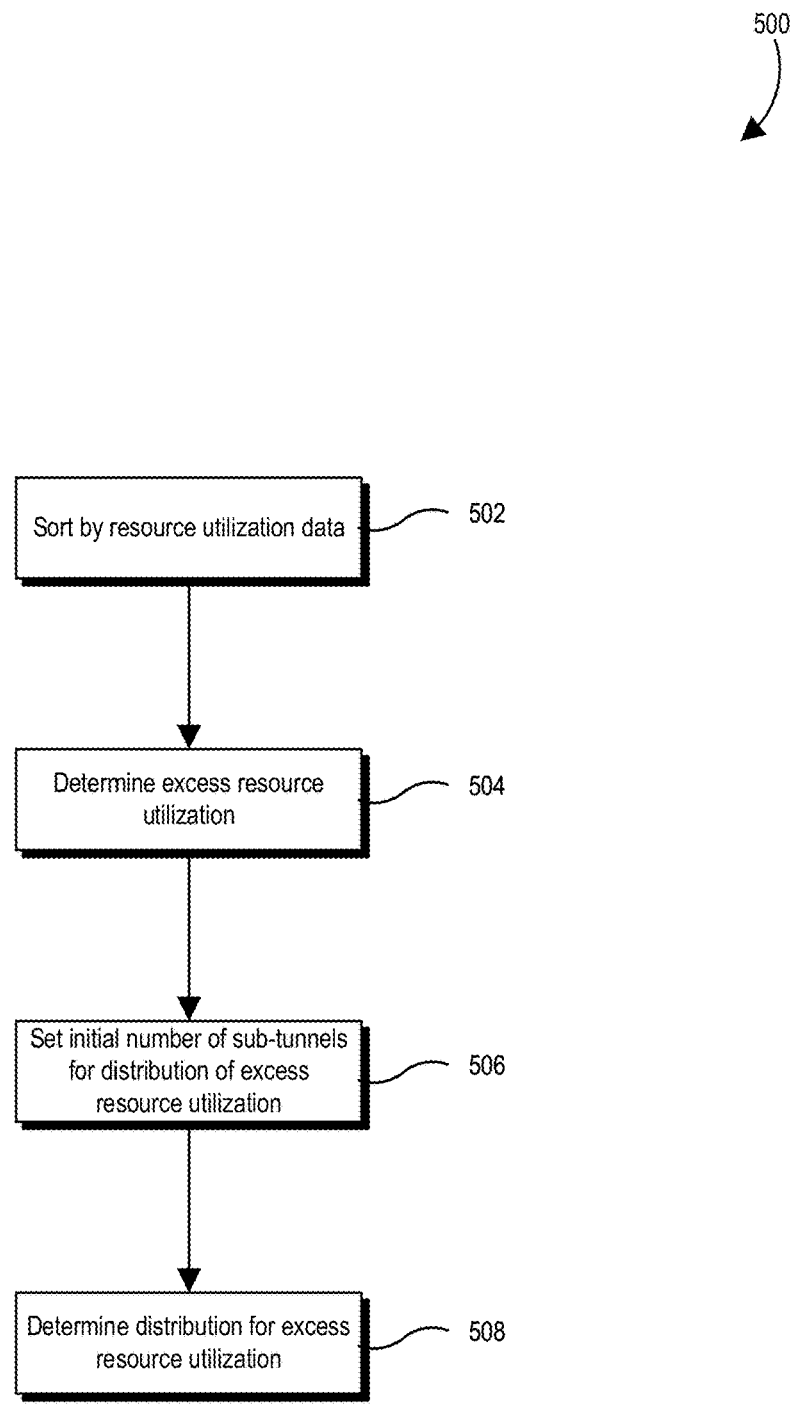
FIG. 5 illustrates a method for determining a resource adjustment for a plurality of sub-tunnels according to one or more embodiments.

FIG. 5 shows a method 500 for performing a least-fill technique to adjust resource utilization of a plurality of sub-tunnels according to one or more embodiments. The method 500 may be performed by any appropriate device, system, or entity described herein, such as the tunnel node 306. The method 500 may be performed as at least part of performance of the adjustment procedure in 412 of the method 400. Performance of the method 500 is described in connection with FIGS. 6A through 6E. The method 500, as well as the diagrams shown in FIGS. 6A through 6E, involves performance of the least-fill technique referenced infra herein.

Figure 6A:
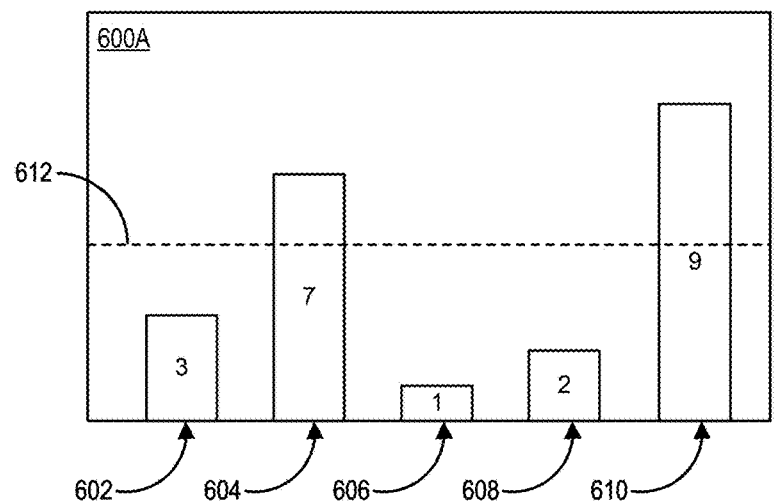
FIG. 6A illustrates a diagram indicating resource utilization by each of the sub-tunnels according to one or more embodiments.

FIG. 6A shows a diagram 600A indicating resource utilization by each of the sub-tunnels 304. The resource utilization shown in the diagram 600A illustrates, for example, network bandwidth utilization or throughput for individual sub-tunnels in a given time interval during an adjustment interval (e.g., adjustment intervals 204 of FIG. 2). The values shown in the diagram 600A may be in data throughput per unit time, such as gigabits per second (Gb/s). The values selected for resource utilization in the method 500 may be, by way of non-limiting example, the maximum resource utilization, the average resource utilization, or a result of a statistical calculation of resource utilization for the individual sub-tunnels during the adjustment interval.

The diagram 600A includes a resource usage 602 of a first sub-tunnel, a resource usage 604 of a second sub-tunnel, a resource usage 606 of a third sub-tunnel, a resource usage 608 of a fourth sub-tunnel, and a resource usage 610 of a fifth sub-tunnel. The diagram 600A also includes a defined utilization threshold 612 having a value of 5 (e.g., 5 Gb/s). As shown in FIG. 6A, the tunnel node 306 detects the resource utilization 604 and 610 of the second and fifth sub-tunnels exceed the defined threshold 612 as described with respect to 410 of the method 400 (see FIG. 4).

Figure 6B:
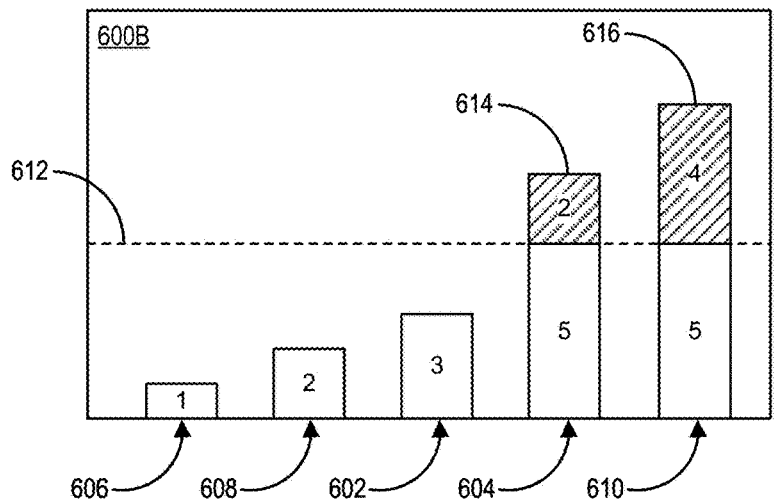
FIG. 6B illustrates a diagram showing a plurality of sub-tunnels sorted by resource utilization during an adjustment interval according to one or more embodiments.

The method 500 includes sorting, at 502, the current sub-tunnels 304 by order of increasing resource utilization. FIG. 6B shows a diagram 600B showing the sub-tunnels 304 sorted by resource utilization during the adjustment interval. Specifically, the tunnel node 306 sorts the sub-tunnels according to the following order: the third sub-tunnel has a resource utilization 606 of 1, the fourth sub-tunnel has a resource utilization 608 of 2, the first sub-tunnel has a resource utilization 602 of 3, the second sub-tunnel has a resource utilization 604 of 7, and the fifth sub-tunnel has a resource utilization 610 of 9.

The method 500 includes determining, at 504, an aggregate excess resource utilization of the sub-tunnels 304 for the adjustment interval. Determining in 504 may include calculating the sum of the excess resource utilizations by the individual sub-tunnels 304. Referring to FIG. 6B, the tunnel node 306 may determine that the second sub-tunnel has an excess resource utilization of 2 and the fifth sub-tunnel has an excess resource utilization of 4. The tunnel node 306 calculates that the aggregate excess utilization for the sub-tunnels is 6.

At 506, the method 500 includes setting an initial number of sub-tunnels for distribution of excess resource utilization. The initial number of sub-tunnels may be set in 506 based on a result of the rebalancing procedure performed at 408 of the method 400. In some instances, the initial number of sub-tunnels may be different than the number of sub-tunnels 304 for the current adjustment interval.

The method 500 includes determining, at 508, a distribution for the excess resource utilization among the initial number of sub-tunnels. Determining the distribution in 508 is, in some implementations, an iterative process in which the excess resource utilization determined in 504 is successively distributed among the sub-tunnels having a resource utilization less than or equal to the next highest resource utilization among the sub-tunnels.

Figure 7:
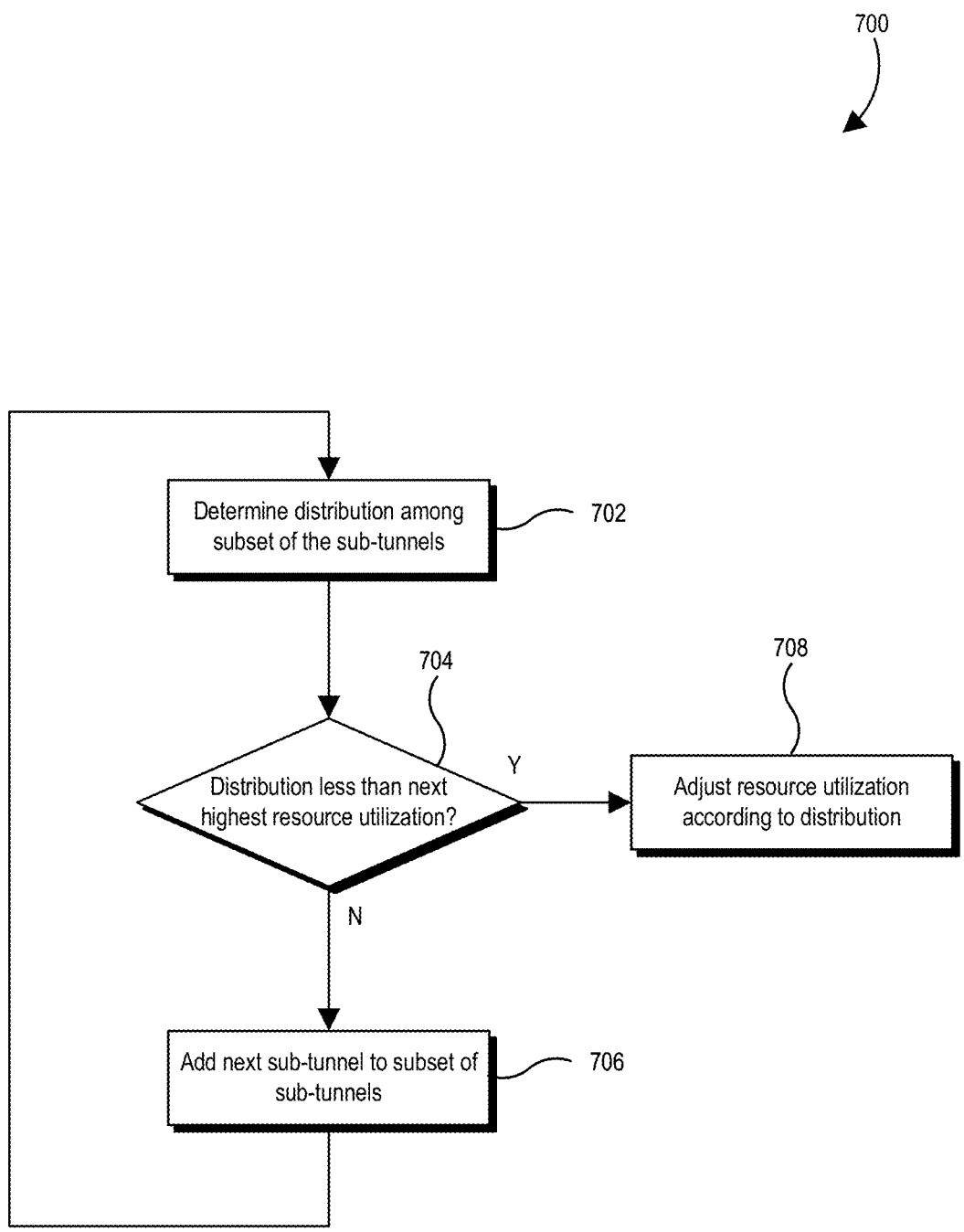
FIG. 7 illustrates a method for distributing the excess resource utilization among the sub-tunnels according to one or more embodiments.

FIG. 7 shows a method 700 for distributing the excess resource utilization among the sub-tunnels according to one or more embodiments. The method 700 is performed as part of or in connection with determining a distribution in 508 of the method 500. The method 700 includes determining, at 702, a proposed distribution of the excess resource utilization among a subset of the sub-tunnels 304. During an initial iteration of the method 700, the subset of the sub-tunnels 304 is set to the sub-tunnel having the lowest resource utilization among the sub-tunnels 304.

Figure 6C:
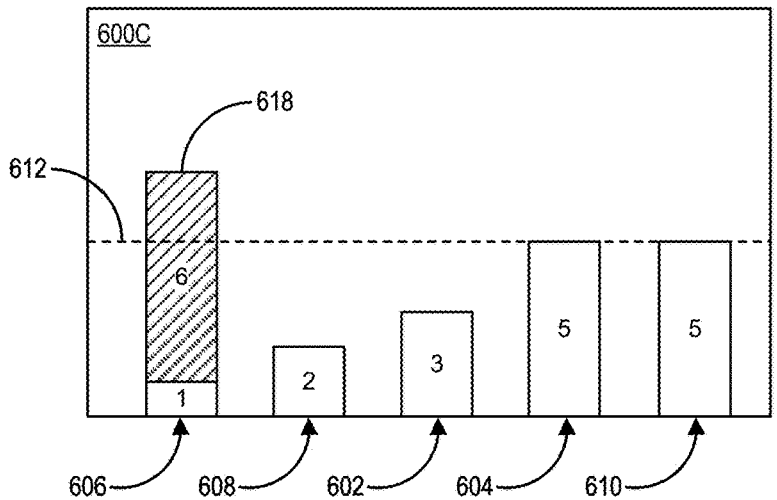
FIG. 6C illustrates a diagram of a proposed excess resource utilization allocated to a sub-tunnel according to one or more embodiments.

FIG. 6C shows a diagram 600C of a proposed excess resource utilization allocated to a sub-tunnel according to one or more embodiments. More particularly, the diagram 600C illustrates a proposed excess resource utilization 618 allocated to a third sub-tunnel 606, which is the sub-tunnel having the lowest resource utilization, as shown in the diagram 600B. The proposed excess resource utilization 618 corresponds to the excess resource utilization determined in 504 of the method 500. For an implementation in which one or more new sub-tunnels are added as a result of the rebalancing procedure 408, the new sub-tunnel(s) is/are considered as having a zero-resource utilization for purposes of the distribution in 508. For an implementation in which one or more new sub-tunnels are removed or discontinued as a result of the rebalancing procedure 408, the resource utilization for the removed sub-tunnel(s) is added to the proposed excess resource utilization 618 and the removed sub-tunnel is removed from consideration as a candidate in the distribution process of 508.

The method 700 includes assessing 704 whether the proposed excess resource is less than a next highest resource utilization. More particularly, the tunnel node 306 performs a comparison of the combined resource utilization of the excess resource utilization 618 and the resource utilization of the lowest resource utilization among the sub-tunnels—the third sub-tunnel 606 in this instance. As a result of determining that the resource utilization for the third sub-tunnel 606 and the excess resource utilization 618 is not less than the resource utilization for the next highest resource utilization (the resource utilization of the fourth sub-tunnel 608 in this case), the method 700 proceeds to 706. With reference to FIG. 6C, for instance, the resource utilization of seven (7) for the third sub-tunnel 606 and the excess resource utilization 618 is greater than resource utilization of two (2) for the fourth sub-tunnel 608.

At 706, the method involves adding the sub-tunnel having the next lowest resource utilization to the subset of the sub-tunnels for which the distribution was determined in 702. In the diagram 600C, for instance, the tunnel node 306 may add the resource utilization of the fourth sub-tunnel 608 to the subset of sub-tunnels consisting of the third sub-tunnel 306.

The method 700 may include determining, at 708, whether the size of the subset of sub-tunnels is greater than or equal to the number of sub-tunnels 304. If, at 708, the tunnel node 306 determines that the size of the subset of sub-tunnels is less than the number of sub-tunnels 304, then the method 700 proceeds back to 702 for the next iteration. At 702, the method 700 includes determining a proposed distribution of the excess resource utilization 618 among a subset of the sub-tunnels 304, which now includes the resource utilizations of the third sub-tunnel 606 and the resource utilization of the fourth sub-tunnel 608.

Figure 6D:
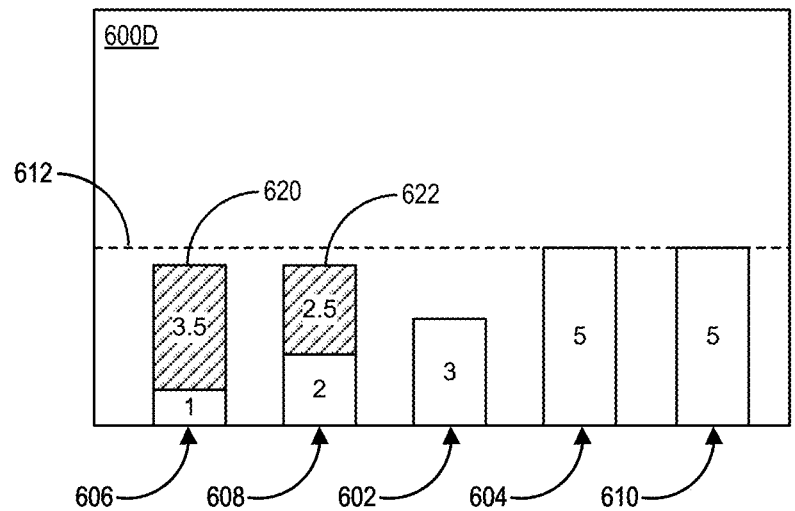
FIG. 6D illustrates a diagram of a proposed excess resource utilization allocated to a plurality of sub-tunnels according to one or more embodiments.

FIG. 6D shows a diagram 600D of a proposed excess resource utilization allocated to a plurality of sub-tunnels according to one or more embodiments. More particularly, the diagram 600D shows a proposed excess resource utilization 618 allocated to the third sub-tunnel 606 and the fourth sub-tunnel 608, which comprise the subset of sub-tunnels. The distribution shown in FIG. 6D, the excess resource utilization 618 is distributed to create equal resource utilization among the subset of sub-tunnels, such that the resource utilizations for the third and fourth sub-tunnels 606 and 608 are equal. The tunnel node 306 may calculate the equalized resource utilization amounts according to the following Equation 2:

$$U_S = \frac{U_E + \sum_{x=1}^{N} U_x}{N} \quad [2]$$

wherein $U_S$ is the equalized resource utilization, $U_E$ is the excess resource utilization 618, $U_X$ is the resource utilization of the individual sub-tunnels of the subset of sub-tunnels, and N is the number of sub-tunnels in the subset of sub-tunnels.

In the diagram 600D and according to Equation 2, a proposed resource utilization 620 for the third sub-tunnel 606 and a proposed resource utilization 622 for the fourth sub-tunnel 608 are equalized at 4.5. Using Equation 2, the sum of the excess resource utilization 618 and the resource utilizations 606 and 608 is 9, which is divided by the number of sub-tunnels (2) to achieve the equalized resource utilization value of 4.5.

The method 700 proceeds again to assessing, at 704, whether the proposed distribution determined in 702 is less than the next highest resource utilization among the sub-tunnels 304. Referring to FIG. 6D, the proposed resource utilizations 620 and 622 exceed the next highest resource utilization, which is the resource utilization for the first sub-tunnel 602. As a result, the method 700 proceeds again to 706, wherein the sub-tunnel having the next highest resource utilization—the first sub-tunnel 602—is added to the subset of sub-tunnels.

Figure 6E:
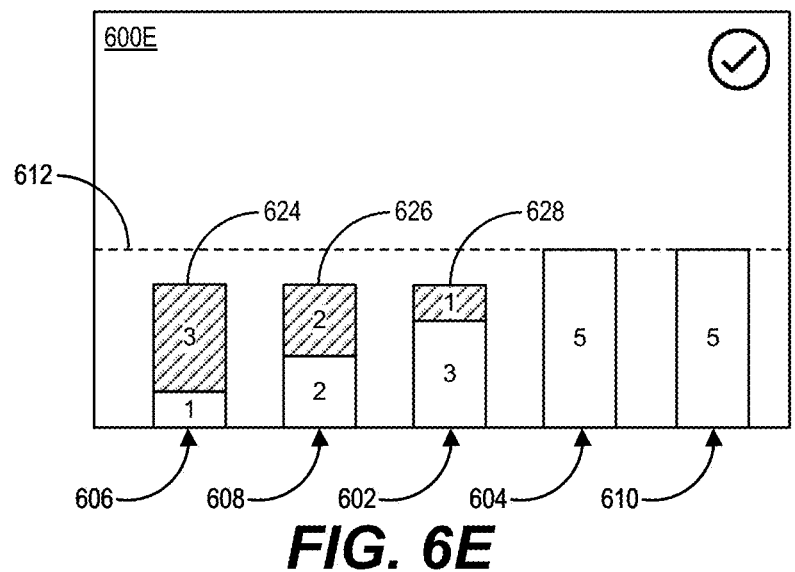
FIG. 6E illustrates a diagram of a proposed excess resource utilization allocated to a plurality of sub-tunnels according to one or more embodiments.

The method 700 proceeds back to determining, at 702, another proposed distribution of resource utilization among the subset of sub-tunnels. FIG. 6E shows a diagram 600E a diagram of a proposed excess resource utilization allocated to a plurality of sub-tunnels according to one or more embodiments. More specifically, the diagram 600E illustrates a proposed distribution of the excess resource utilization 618 among the third sub-tunnel 606, the fourth sub-tunnel 608, and the first sub-tunnel 602, which comprise the subset of sub-tunnels to be considered. The proposed distribution in the diagram 600E includes a proposed utilization 624 for the third sub-tunnel 606, a proposed utilization 626 for the fourth sub-tunnel 608, and a proposed utilization 628 for the first sub-tunnel 602. The proposed utilizations 624, 626, and 628 are determined at least in part based on Equation 2 supra.

The method 700 proceeds to assessing, at 704, whether the proposed distribution of resource utilization determined in 702 is less than the next highest resource utilization among the sub-tunnels 304. Referring to FIG. 6E, the proposed utilizations 624, 626, and 628 are less than the next highest resource utilization of 5 for the second sub-tunnel 604. The method 700 proceeds to adjusting, at 708, the resource utilization of the subset of sub-tunnels according to the distribution determined in 702. In this instance, the excess resource utilizations 614 and 616 are equitably distributed among the first sub-tunnel 602, the third sub-tunnel 606, and the fourth sub-tunnel 608, thereby reducing the load on the second sub-tunnel 604 and the fifth sub-tunnel 610. As a result of completing the adjustment in 708, the tunnel node 306 returns to 402 of the method 400, wherein the tunnel node 306 collects network resource utilization data for the sub-tunnels 402.

Management of the sub-tunnels resource utilization described herein further includes improvements to collection of resource utilization data. More particularly, the collection and storage of network resource utilization data and updating aggregate resource utilization data includes improvements to data storage and retrieval. In the techniques described herein, a sub-tunnel historical resource utilization values may be stored for a defined amount of time (e.g., 1 hour) to determine maximum utilization values over that time. In connection with delaying discontinuation of a selected sub-tunnel, as described with respect to FIG. 4 and elsewhere herein, the resource utilization history of the selected sub-tunnel may also be preserved.

Preserving the resource utilization data of a sub-tunnel selected for discontinuation or removal also involves significant data storage and computational resources. Several techniques are implemented to reduce the data storage and computational resources involved with preserving such resource utilization data. In some embodiments, the tunnel node 306 would store the historical resource utilization values in a data set and iterate over the data set to find a maximum value and remove values that are too old (e.g., exceed a defined time range). However, this approach may be too slow and may occupy a significant amount of data storage space.

The tunnel node 306, in some embodiments, implements two modifications that improve the efficiency of storing and retrieving the historical values for such operations. First, the tunnel node 306 implements two collections or sets of data: one collection includes a queue to remove values exceeding a defined time range prior to a current time, and another collection sorted by bandwidth to efficiently find a maximum utilization value over the range. Second, the tunnel node 306 establishes a maximum collection size by discarding utilization values that are identified as being unnecessary.

The techniques of the present disclosure include features for reducing the amount of data storage utilized for preserving resource utilization data of a sub-tunnel selected for discontinuation or removal. A defined window or time range (e.g., one or more rebalance intervals 202, one or more adjustment intervals 204) may be provided in which new data points may be collected at a defined interval (e.g., once every few seconds). As a result, the data set for a window may grow large over time, occupying a significant amount of data storage space.

Figure 8A:
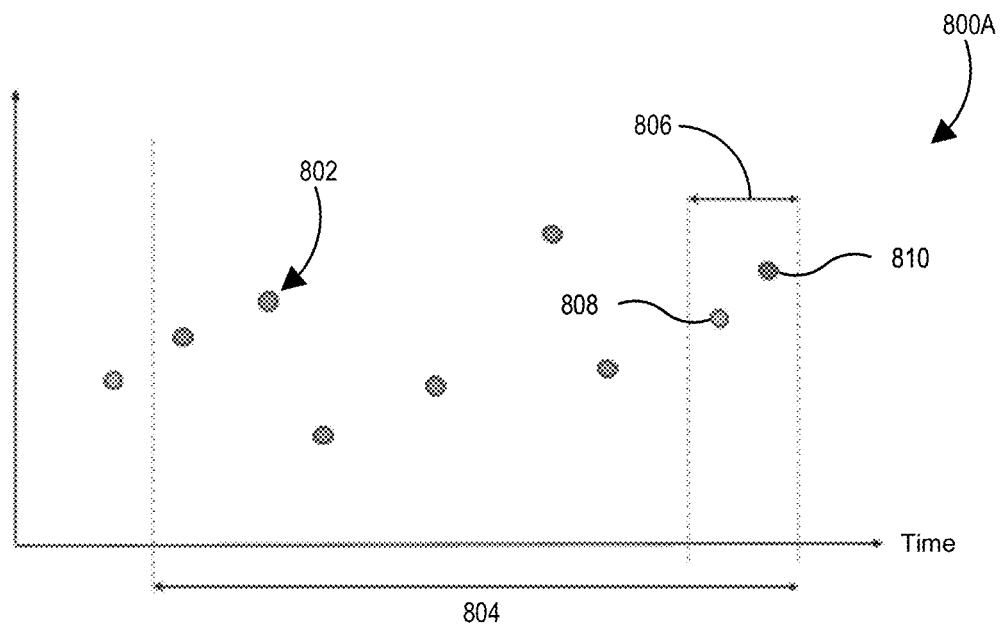
FIG. 8A illustrates a diagram of a set of example data points representing resource utilization of a sub-tunnel over a time interval.

Network devices, such as the tunnel node 306, configured according to one or more embodiments herein may implement various techniques for reducing the number of data points stored for a defined retention window. One set of such techniques are described with respect to FIGS. 8A and 8B. FIG. 8A shows a diagram 800A of a set of data points representing resource utilization of a sub-tunnel over a time interval. The diagram 800A includes a plurality of data points 802 at least some of which were collected during a defined time frame 804. The inventors of the present disclosure observed that some of the collected data points do not significantly affect a maximum resource utilization value for the time frame 804.

In the diagram 800A, a recently captured or penultimate data point 808 is collected in a sub-window 806 at the end of the window 804. A data point 810 is collected subsequent to the data point 808. The data point 808 cannot be a maximum resource utilization value for the window 804 because the data point 810 has a greater value than the data point 808 and occurs after the data point 808. For purposes of determining a maximum resource utilization value for the window 804, if a data point 810 collected after the data point 808 within a defined sub-window 806 has a value greater or equal to a value of one or more data points 808 in the sub-window 806, the one or more data points 808 can be discarded or removed from consideration. The sub-window 806 may be a time-range, at the end of the defined window 804, defined by an authorized user (e.g., network administrator).

Figure 8B:
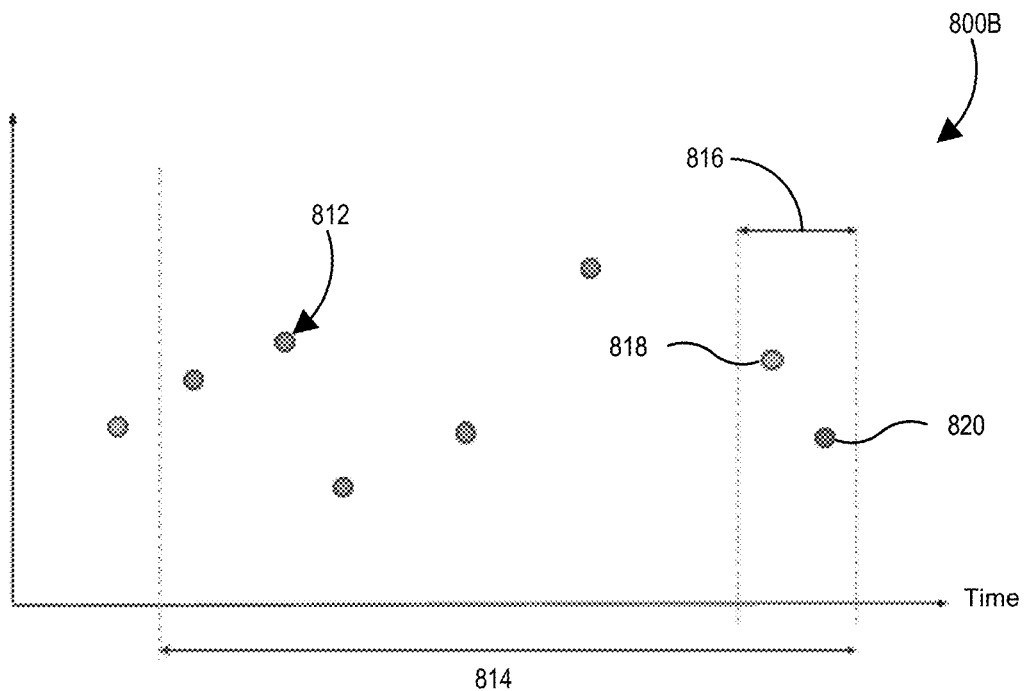
FIG. 8B illustrates a diagram of a set of example data points representing resource utilization of a sub-tunnel over a time interval.

FIG. 8B shows a diagram 800B of a set of data points representing resource utilization of a sub-tunnel over a time interval. The diagram 800B includes a plurality of data points 812 at least some of which were collected during a defined time frame 814. The inventors of the present disclosure observed that some of the collected data points do not significantly affect a maximum resource utilization value for the time frame 814.

In the diagram 800B, a recently captured or penultimate data point 818 is collected in a sub-window 816 at the end of the window 814. A data point 820 is collected subsequent to the data point 818. The data point 820 cannot be a maximum resource utilization value for the window 814 because the data point 820 has a lower value than the data point 818 and occurs after the data point 818. For purposes of determining a maximum resource utilization value for the window 814, if a data point 820 collected after one or more data points 818 within a defined sub-window 816 has a value less than a value of one or more data points 818 in the sub-window 816, the data point 820 may be discarded or removed from consideration in some embodiments. The sub-window 816 may be a time-range, at the end of the defined window 814, defined by an authorized user (e.g., network administrator).

In some embodiments, a tunnel node, such as a network device that is a tunnel source end or head-end of a network tunnel, according to the present disclosure may be configured to implement techniques for reducing the number of data points stored for a defined retention window, as described with respect to FIGS. 8A and 8B. A maximum data storage size (in number of data points) and/or a window size (in unit time) may be defined in memory of the tunnel node for the windows 804 and/or 814. The tunnel node may determine a size (e.g., time interval) of the sub-windows 806 and/or 816 based on the maximum data storage size and/or the window size. For instance, the size of the sub-windows 806 and 816 may be a ratio of the window size to the maximum data storage size. Discarding superfluous data points in the sub-windows 806 and/or 816 can lead to a significant reduction in storage space used to collect resource utilization data points according to the features disclosed herein. Operation of data collection and storage can be tuned to adjust accuracy of the data points collected.

Figure 9A:
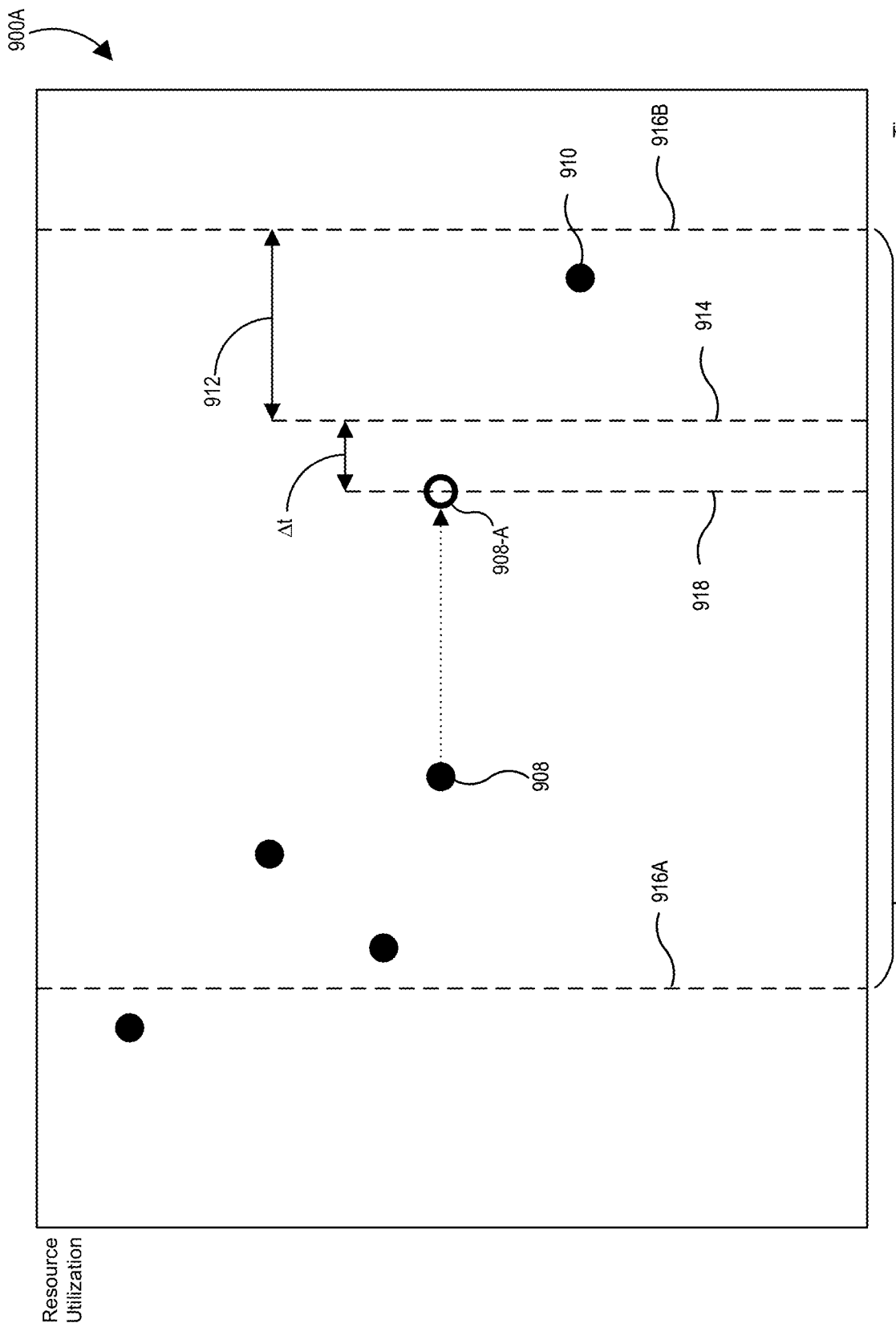
FIG. 9A illustrates a illustrates a diagram of a set of example data points representing resource utilization of a sub-tunnel during a time interval.
Figure 9B:
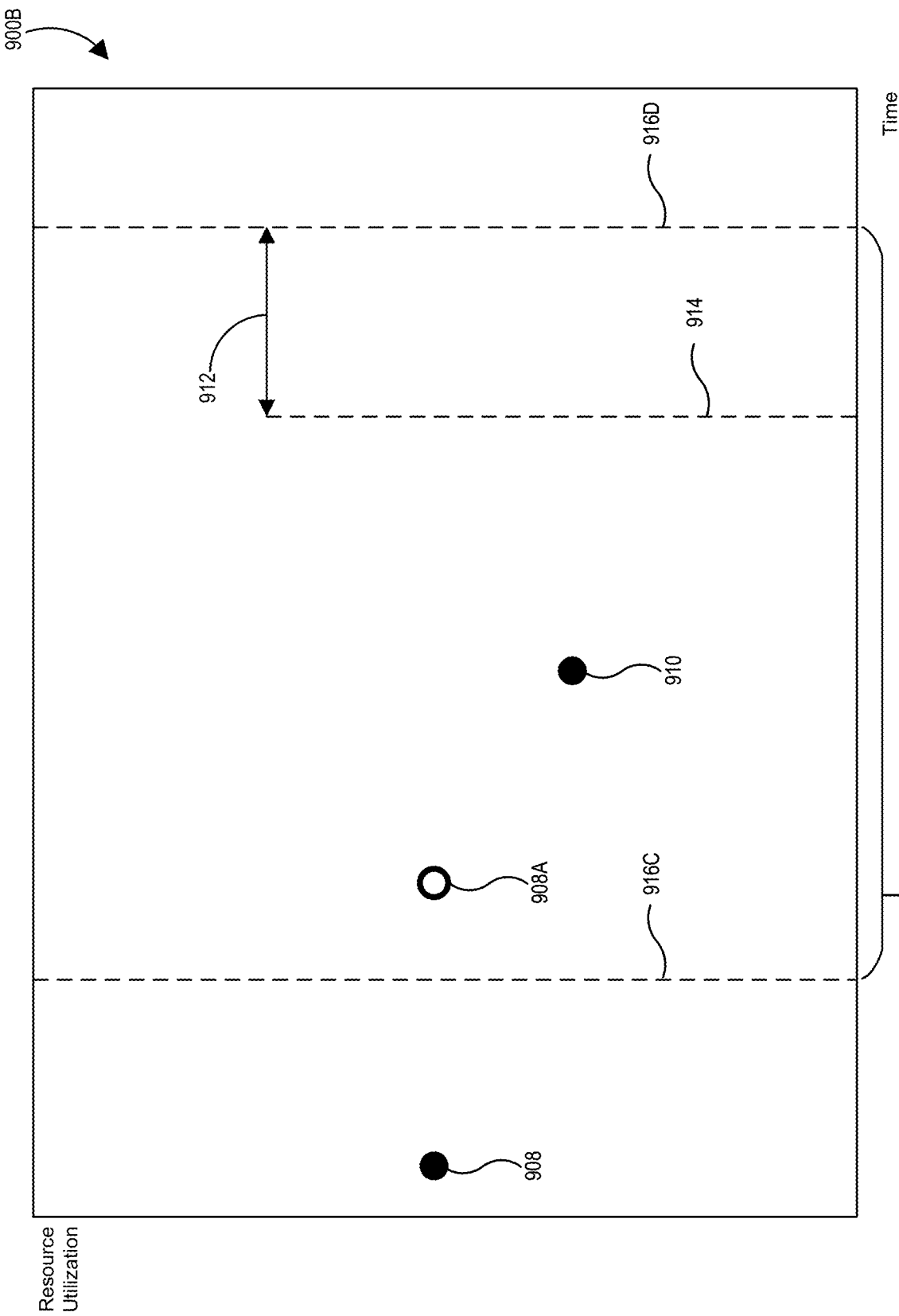
FIG. 9B illustrates a diagram 900B of example data points representing resource utilization of a sub-tunnel during a second time interval subsequent to the first time interval of FIG. 9A.

Another set of techniques for reducing the number of data points stored for a defined retention window are described with respect to FIGS. 9A and 9B. FIG. 9A illustrates a diagram 900A of a set of data points representing resource utilization of a sub-tunnel during a first time interval. FIG. 9B illustrates a diagram 900B of data points representing resource utilization of a sub-tunnel during a second time interval subsequent to the first time interval. The diagram 900A includes data points collected during a first time frame 904A. The diagram 900B includes data points collected during a time frame 904B that includes a portion of data points in the time frame 904A. More particularly, the time frame 904A in FIG. 9A is from a first time 916A to a second time 916B. The time frame 904B in FIG. 9B is from a third time 916C to a fourth time 916D. In the time frame 904B, the third time 916C is after the first time 916A and the fourth time 916D is after the second time 916B.

A scenario may arise in which a resource utilization data point is not obtained for a long period of time. For instance, a data point 908 in the time frame 904A may be collected at a first time and then a second data point 910 may be collected at a second time long after the first data point 908. If the resource utilization value of the second data point 910 is lower than the resource utilization value of the first data point 908, the situation described with respect to FIG. 8B may arise in which the second data point 910 may become the new maximum value for the window 904A. For instance, the second data point 910 may become the new maximum value for the window 904A even though the first data point 908 has a higher value for a time within the window 904A.

A tunnel node implementing the techniques discussed with respect to FIGS. 8A and 8B may be configured to detect that, at a time at which the second data point 910 was sampled, a defined sub-window 912 does not include another data point. The sub-window 912 includes a fifth time 914 that is a defined amount of time prior to the second time 916B. The second time 916B may be a current time in some implementations.

In response to detecting the absence of another data point in the sub-window 912 and collecting the second data point 910, the tunnel node 306 is configured to adjust a time of the first data point 908 to an adjusted time 918 that precedes the sub-window 912 by a time $\Delta t$. During the time frame 904B and as a result of adjusting the time of the first data point 908 to the adjusted time 918, the tunnel node 306 still considers an adjusted first data point 908-A as the maximum resource utilization value for the window 904B. The time $\Delta t$ between the fifth time 914 and an adjusted time 918 of the adjusted first data point 908-A is, in some embodiments, defined in memory of the tunnel node. In some embodiments, the time $\Delta t$ is based on a sample rate of the network device. For instance, the time $\Delta t$ may be a sample interval prior to the fifth time 914 or a time interval corresponding to a multiple of the sample rate of the network device. In some embodiments, the time $\Delta t$ is selectively adjustable by an authorized user. The sub-window 912 corresponds to the sub-window 806 described with respect to FIGS. 8A and 8B. As a result of the features described with respect to FIGS. 9A and 9B, in conjunction with the features of FIGS. 8A and 8B, a previous value from the time frame 904A is not discarded during the time frame 904B due to a long interval between data points.

Figure 10:
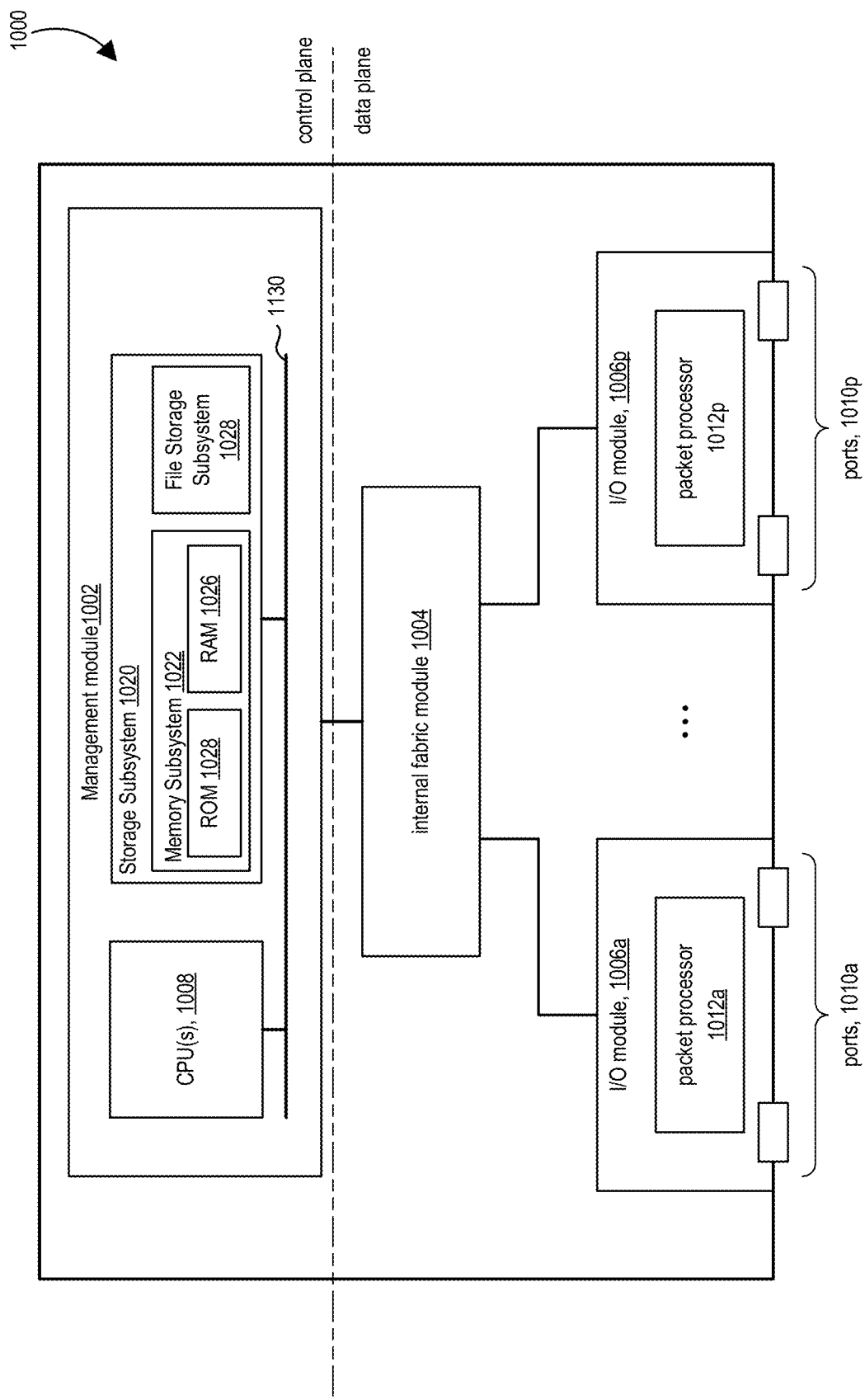
FIG. 10 illustrates a network device that is adapted to operate according to one or more embodiments of the present disclosure.

FIG. 10 illustrates a network device 1000 that is adapted to operate according to one or more embodiments of the present disclosure. The network device 1000 may be a switch or a router, for example, or any other device that has network traffic switching or routing, or generally, forwarding capabilities. As shown, network device 1000 can include a management module 1002, an internal fabric module 1004, and a number of I/O modules 1006a-1006p. The management module 1002 may be disposed in a control plane (also referred to as control layer) of the network device 1000 and can include one or more management CPUs 1008 for managing and controlling operation of network device 1000 in accordance with the present disclosure. Each management CPU 1008 can be a general-purpose processor, such as an Intel®/AMD® x86-64 or ARM® processor, that operates under the control of software stored in memory, such as a storage subsystem 1020, which may include read-only memory (ROM) 1028 and/or random-access memory (RAM) 1026. In some embodiments, the CPU 1008 may include control circuitry, and may include or be coupled to a non-transitory storage medium storing encoded instructions that cause the CPU 1008 to perform operations described herein. In some embodiments, the non-transitory storage medium may include encoded logic or hardwired logic for controlling operation of the CPU 1008. The control plane refers to all the functions and processes that determine which path to use, such as routing protocols, spanning tree, and the like.

Internal fabric module 1004 and I/O modules 1006a-1006p collectively represent the data plane of network device 1000 (also referred to as data layer, forwarding plane, etc.). Internal fabric module 1004 is configured to interconnect the various other modules of network device 1000. Each I/O module 1006a-1006p includes one or more input/output ports 1010a-1010p that are used by network device 1000 to send and receive network packets. Each I/O module 1006a-1006p can also include a packet processor 1012a-1012p. Each packet processor 1012a-1012p can comprise a forwarding hardware component configured to make wire speed decisions on how to handle incoming (ingress) and outgoing (egress) network packets. In some embodiments, the forwarding hardware can comprise an application specific integrated circuit (ASIC), a field programmable array (FPGA), a digital processing unit, or other such collection of configured logic.

FURTHER EMBODIMENTS

Embodiments disclosed herein include a method comprising establishing, at a first time, a first distribution for resource utilization of a plurality of sub-tunnels of a network tunnel between a first tunnel endpoint and a second tunnel endpoint, the plurality of sub-tunnels operating according to a Resource Reservation Protocol and including a first sub-tunnel having a first resource utilization that is different than a second resource utilization of a second sub-tunnel; receiving, subsequent to the first time, a data set for a first time period indicating network resource utilization for each sub-tunnel of the plurality of sub-tunnels; detecting an excess resource utilization of a first set of sub-tunnels of the plurality of sub-tunnels based on the data set, the excess resource utilization exceeding a defined utilization threshold; determining a second distribution of the excess resource utilization over a second set of sub-tunnels of the plurality of sub-tunnels in response to detecting the excess resource utilization, the second distribution including a first equalized resource utilization over the second set of sub-tunnels that is less than a first next highest resource utilization among an ordered set of the plurality of sub-tunnels; and establishing, at a second time after the first time, the second distribution for the second set of sub-tunnels.

In some embodiments, a resource utilization of each of the second set of sub-tunnels is less than the defined utilization threshold for the first time period. In some embodiments, the method comprises determining a second equalized resource distribution of the excess resource utilization over a third set of sub-tunnels that is smaller than the second set of sub-tunnels; detecting that the second equalized resource distribution is equal to or exceeds a second next highest resource utilization among the ordered set; and identifying the second set of sub-tunnels as a result of detecting that the second equalized resource distribution is equal to or exceeds the second next highest resource utilization.

In some embodiments, the method comprises identifying a maximum collective resource utilization of the plurality of sub-tunnels during the first time period; detecting that the maximum collective resource utilization for the first time period exceeds a defined utilization threshold; and adding a new sub-tunnel to the plurality of sub-tunnels as a result of detecting that the maximum collective resource utilization exceeds the defined utilization threshold, wherein the new sub-tunnel is included in the second set of sub-tunnels.

In some embodiments, the method comprises determining that a subset of the plurality of sub-tunnels can accommodate a resource utilization of the network tunnel based on aggregate resource utilization data that includes a maximum collective resource utilization of the plurality of sub-tunnels during the first time period; and discontinuing a sub-tunnel of the plurality of sub-tunnels in response to determining that the fewer number of sub-tunnels can accommodate the resource utilization of the network tunnel, wherein a resource utilization of the sub-tunnel is included in the excess resource utilization. In some embodiments, the method comprises updating aggregate resource utilization data to include a maximum collective resource utilization of the plurality of sub-tunnels during the first time period, the aggregate resource utilization data including maximum collective resource utilization data for the plurality of sub-tunnels over a second time period longer than the first time period.

In some embodiments, the method comprises sorting the plurality of sub-tunnels into the ordered set according to increasing resource utilization based on the data set for the first time period. In some embodiments, the method comprises detecting, in a second time period within the first time period, that a first utilization data point has a lower resource utilization value than a second utilization data point, one data point of the first data point and the second data point being a most recent data point; and discarding the first utilization data point as a result of detecting that the first utilization data point has the lower resource utilization value.

Embodiments of the present disclosure include a network device storing instructions that, as a result of execution by the network device, cause the network device to detect an excess resource utilization of a first set of a plurality of sub-tunnels based on network resource utilizations of the plurality of sub-tunnels; determine a first distribution of the excess resource utilization over a second set of the plurality of sub-tunnels; determine a second distribution of the excess resource utilization over a third set of the plurality of sub-tunnels in response to a determination that a first resource utilization associated with the first distribution exceeds a first next highest resource utilization among the plurality of sub-tunnels relative to the first resource utilization; and establish the second distribution for the third set in response to a determination that a second resource utilization associated with the second distribution is less than a second next highest resource utilization among the plurality of sub-tunnels relative to the second resource utilization.

In some embodiments, execution of the instructions causes the network device to update aggregate resource utilization data to include a maximum collective resource utilization of the plurality of sub-tunnels during a first time period, the aggregate resource utilization data including maximum collective resource utilization for a network tunnel including the plurality of sub-tunnels over a second time period that includes the first time period; determine that the aggregate resource utilization data fails to satisfy a set of resource utilization criteria; and adjust a number of the plurality of sub-tunnels for a third time period after the first time period in response to determination that the aggregate resource utilization data fails to satisfy the set of resource utilization criteria.

In some embodiments, determination of the second distribution is based on adjustment of the number of the plurality of sub-tunnels. In some embodiments, the second resource utilization is an equalized resource utilization for the third set of sub-tunnels resulting from the second distribution. In some embodiments, the third set includes a greater number of the plurality of sub-tunnels than the second set.

In some embodiments, execution of the instructions causes the network device to sort the plurality of sub-tunnels into an ordered set according to increasing resource utilization for the first time period, wherein determination of the second distribution is based on the ordered set.

Embodiments of the present disclosure include one or more non-transitory computer readable media storing instructions that, as a result of execution by one or more processors, cause the one or more processors to monitor resource utilization of each sub-tunnel of a plurality of sub-tunnels of a network tunnel implementing a Reservation Resource Protocol; as a result of a detection that a resource utilization of a first set of sub-tunnels of the plurality of sub-tunnels exceeds a defined utilization threshold, determine an adjusted resource utilization of a second subset of the plurality of sub-tunnels based on resource utilization of each of the sub-tunnels during a current measurement period, wherein the resource utilization of each sub-tunnel of the second subset of sub-tunnels during the current measurement period is less than the defined utilization threshold; and establish the adjusted resource utilization for the second set of sub-tunnels for a next measurement period, wherein the adjusted resource utilization of each sub-tunnel of the second subset of sub-tunnels is less than a lowest resource utilization among the first set of sub-tunnels.

In some embodiments, execution of the instructions stored on the one or more non-transitory computer readable media cause the one or more processors to store a first collection of network resource utilization data and a second collection of network resource utilization data for the plurality of sub-tunnels; determine that the first collection includes first resource utilization data associated with a time exceeding a defined time range prior to the current measurement period; delete the first resource utilization data as a result of a determination that the time exceeds the defined time range; sort the second collection by magnitude of the resource utilization; and identify a maximum resource utilization in the second collection for a defined time period.

In some embodiments, execution of the instructions stored on the one or more non-transitory computer readable media cause the one or more processors to receive a plurality of data points indicating the resource utilizations of the plurality of sub-tunnels; detect that a first utilization data point of the plurality of data points has a lower resource utilization value than a second utilization data point of the plurality of data points, one data point of the first data point and the second data point being a most recent data point and another data point of the first data point and the second data point being a second most recent data point; and discard the first utilization data point as a result of detecting that the first utilization data point has the lower resource utilization value.

In some embodiments, execution of the instructions stored on the one or more non-transitory computer readable media cause the one or more processors to receive first data indicating a first resource utilization of a sub-tunnel of the plurality of sub-tunnels, the first data associated with a first time; receive second data indicating a second network resource utilization of the sub-tunnel, the second data associated with a second time subsequent to the first time; detect that the first time is outside of a defined time period; and adjust the first time to an adjusted first time after the first time and before the second time in response to detection that the first time is prior to the defined time period.

In some embodiments, the third set includes a greater number of the plurality of sub-tunnels than the second set. In some embodiments, the adjusted resource utilization is a distribution of excess resource utilization among the second subset of sub-tunnels.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices may include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items"), unless otherwise noted or contradicted by context, is to be construed as a nonempty collection comprising one or more members. The term "subset" (e.g., "a subset of a set of items") may be construed as a proper subset comprising a fewer number of members than the referenced set.

Conjunctive language, such as phrases of the form "at least one of A, B, and C," or "one or more of A, B, and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrase "at least one of A, B, and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations. In some embodiments, the techniques and methods described herein (e.g., methods 400, 500, 700, 700B) may be performed in a different order.

The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

The invention claimed is:

1. A method comprising:
   establishing, at a first time, a first distribution for resource utilization of a plurality of sub-tunnels of a network tunnel between a first tunnel endpoint and a second tunnel endpoint, the plurality of sub-tunnels operating according to a Resource Reservation Protocol and including a first sub-tunnel having a first resource utilization that is different than a second resource utilization of a second sub-tunnel;
   receiving, subsequent to the first time, a data set for a first time period indicating network resource utilization for each sub-tunnel of the plurality of sub-tunnels;
   detecting an excess resource utilization of a first set of sub-tunnels of the plurality of sub-tunnels based on the data set, wherein sub-tunnels in the first set of sub-tunnels exceed a defined utilization threshold;
   in response to detecting the excess resource utilization, establishing at a second time after the first time a second distribution of the excess resource utilization over a second set of sub-tunnels of the plurality of sub-tunnels different from the first set of sub-tunnels, including:
      determining an ordered set of the plurality of sub-tunnels by sorting the plurality of sub-tunnels according to the network resource utilization indicated in the data set; and
      determining the second distribution of the excess resource utilization over the second set of sub-tunnels of the plurality of sub-tunnels based on the ordered set of the plurality of sub-tunnels, the second distribution including a first equalized resource utilization over the second set of sub-tunnels that is less than a first next highest resource utilization among the ordered set of the plurality of sub-tunnels.

2. The method of claim 1, wherein a resource utilization of each of the second set of sub-tunnels is less than the defined utilization threshold for the first time period.

3. The method of claim 1, comprising:
   determining a second equalized resource distribution of the excess resource utilization over a third set of sub-tunnels that is smaller than the second set of sub-tunnels;
   detecting that the second equalized resource distribution is equal to or exceeds a second next highest resource utilization among the ordered set; and
   identifying the second set of sub-tunnels as a result of detecting that the second equalized resource distribution is equal to or exceeds the second next highest resource utilization.

4. The method of claim 1, comprising:
   identifying a maximum collective resource utilization of the plurality of sub-tunnels during the first time period;
   detecting that the maximum collective resource utilization for the first time period exceeds a second defined utilization threshold; and
   adding a new sub-tunnel to the plurality of sub-tunnels as a result of detecting that the maximum collective resource utilization exceeds the second defined utilization threshold, wherein the new sub-tunnel is included in the second set of sub-tunnels.

5. The method of claim 1, comprising:
   determining that a subset of the plurality of sub-tunnels is configured to accommodate a resource utilization of the network tunnel based on aggregate resource utilization data that includes a maximum collective resource utilization of the plurality of sub-tunnels during the first time period; and
   discontinuing a sub-tunnel of the plurality of sub-tunnels in response to determining that fewer number of sub-tunnels is configured to accommodate the resource utilization of the network tunnel, wherein a resource utilization of the sub-tunnel is included in the excess resource utilization.

6. The method of claim 1, comprising:
   updating aggregate resource utilization data to include a maximum collective resource utilization of the plurality of sub-tunnels during the first time period, the aggregate resource utilization data including maximum collective resource utilization data for the plurality of sub-tunnels over a second time period longer than the first time period.

7. The method of claim 1, comprising:
sorting the plurality of sub-tunnels into the ordered set according to increasing resource utilization based on the data set for the first time period.

8. The method of claim 1, comprising:
detecting, in a second time period within the first time period, that a first utilization data point has a lower resource utilization value than a second utilization data point, one data point of the first data point and the second data point being a most recent data point; and
discarding the first utilization data point as a result of detecting that the first utilization data point has the lower resource utilization value.

9. A network device comprising a processor and a non-transitory storage medium having stored thereon instructions that, as a result of execution of the instructions by the processor, cause the network device to:
detect an excess resource utilization of a first set of a plurality of sub-tunnels based on network resource utilizations of the plurality of sub-tunnels;
determine an ordered set of the plurality of sub-tunnels by sorting the plurality of sub-tunnels according to the network resource utilizations;
determine a first distribution of the excess resource utilization over a second set of the plurality of sub-tunnels based on the ordered set of the plurality of sub-tunnels;
determine a second distribution of the excess resource utilization over a third set of the plurality of sub-tunnels based on the ordered set of the plurality of sub-tunnels in response to a determination that a first resource utilization associated with the first distribution exceeds a first next highest resource utilization among the plurality of sub-tunnels relative to the first resource utilization; and
establish the second distribution for the third set in response to a determination that a second resource utilization associated with the second distribution is less than a second next highest resource utilization among the plurality of sub-tunnels relative to the second resource utilization.

10. The network device of claim 9, wherein execution of the instructions causes the network device to:
update aggregate resource utilization data to include a maximum collective resource utilization of the plurality of sub-tunnels during a first time period, the aggregate resource utilization data including maximum collective resource utilization for a network tunnel including the plurality of sub-tunnels over a second time period that includes the first time period;
determine that the aggregate resource utilization data fails to satisfy a set of resource utilization criteria; and
adjust a number of the plurality of sub-tunnels for a third time period after the first time period in response to determination that the aggregate resource utilization data fails to satisfy the set of resource utilization criteria.

11. The network device of claim 10, wherein
determination of the second distribution is based on adjustment of a number of the plurality of sub-tunnels.

12. The network device of claim 9, wherein execution of the instructions causes the network device to:
sort the plurality of sub-tunnels into the ordered set according to increasing resource utilization for a first time period.

13. The network device of claim 9, wherein the second resource utilization is an equalized resource utilization for the third set of sub-tunnels resulting from the second distribution.

14. The network device of claim 9, wherein the third set includes a greater number of the plurality of sub-tunnels than the second set.

15. One or more non-transitory computer readable media storing instructions that, as a result of execution by one or more processors, cause the one or more processors to:
monitor resource utilization of each sub-tunnel of a plurality of sub-tunnels of a network tunnel implementing a Reservation Resource Protocol;
as a result of a detection that a resource utilization of a first set of sub-tunnels of the plurality of sub-tunnels exceeds a defined utilization threshold, determine an adjusted resource utilization of a second set of sub-tunnels of the plurality of sub-tunnels based on resource utilization of each of the sub-tunnels of the second set of sub-tunnels during a current measurement period, wherein the resource utilization of each sub-tunnel of the second set of sub-tunnels during the current measurement period is less than the defined utilization threshold; and
establish the adjusted resource utilization for the second set of sub-tunnels for a next measurement period, including:
determining an ordered set of the plurality of sub-tunnels by sorting the plurality of sub-tunnels according to the resource utilization of each of the sub-tunnels of the plurality of sub-tunnels during the current measurement period; and
determining the adjusted resource utilization for the second set of sub-tunnels of the plurality of sub-tunnels based on the ordered set of the plurality of sub-tunnels, wherein the adjusted resource utilization of each sub-tunnel of the second set of sub-tunnels is less than a lowest resource utilization among the first set of sub-tunnels.

16. The one or more non-transitory computer readable media of claim 15, wherein execution of the instructions causes the one or more processors to:
store a first collection of network resource utilization data and a second collection of network resource utilization data for the plurality of sub-tunnels;
determine that the first collection includes first resource utilization data associated with a time exceeding a defined time range prior to the current measurement period;
delete the first resource utilization data as a result of a determination that the time exceeds the defined time range;
sort the second collection by magnitude of the resource utilization; and
identify a maximum resource utilization in the second collection for a defined time period.

17. The one or more non-transitory computer readable media of claim 15, wherein execution of the instructions causes the one or more processors to:
receive a plurality of data points indicating resource utilizations of the plurality of sub-tunnels;
detect that a first utilization data point of the plurality of data points has a lower resource utilization value than a second utilization data point of the plurality of data points, one data point of the first data point and the second data point being a most recent data point and an other data point of the first data point and the second data point being a second most recent data point; and discard the first utilization data point as a result of detecting that the first utilization data point has the lower resource utilization value.

18. The one or more non-transitory computer readable media of claim 15, wherein execution of the instructions causes the one or more processors to:

receive first data indicating a first resource utilization of a sub-tunnel of the plurality of sub-tunnels, the first data associated with a first time;

receive second data indicating a second network resource utilization of the sub-tunnel, the second data associated with a second time subsequent to the first time;

detect that the first time is outside of a defined time period; and adjust the first time to an adjusted first time after the first time and before the second time in response to detection that the first time is prior to the defined time period.

19. The one or more non-transitory computer readable media of claim 15, wherein the resource utilization represents utilization of the plurality of sub-tunnels to provide bandwidth in a network device.

20. The one or more non-transitory computer readable media of claim 15, wherein the adjusted resource utilization is a distribution of excess resource utilization among the second set of sub-tunnels.

* * * * *